US012076981B2

(12) United States Patent
Nakazawa et al.

(10) Patent No.: US 12,076,981 B2
(45) Date of Patent: Sep. 3, 2024

(54) INKJET RECORDING DEVICE INCLUDING GUIDE MEMBER WHOSE PORTION IS ALIGNED WITH AND AT THE SAME HEIGHT AS STORAGE BODY

(71) Applicant: BROTHER KOGYO KABUSHIKI KAISHA, Nagoya (JP)

(72) Inventors: Fumio Nakazawa, Okazaki (JP); Yoshinori Osakabe, Seto (JP); Hirotaka Aoki, Nagoya (JP); Takashi Yoshikawa, Kasugai (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 25 days.

(21) Appl. No.: 17/935,186

(22) Filed: Sep. 26, 2022

(65) Prior Publication Data

US 2023/0018534 A1 Jan. 19, 2023

Related U.S. Application Data

(63) Continuation of application No. PCT/JP2021/007857, filed on Mar. 2, 2021.

(30) Foreign Application Priority Data

Mar. 26, 2020 (JP) ................................ 2020-056529

(51) Int. Cl.
*B41J 13/10* (2006.01)

(52) U.S. Cl.
CPC ............. *B41J 13/10* (2013.01); *B41J 13/103* (2013.01)

(58) Field of Classification Search
CPC ... B41J 2/01; B41J 2/165; B41J 2/1721; B41J 2/17509; B41J 29/13; B41J 2/38; B41J 2002/1735; B41J 213/10; B41J 13/103
See application file for complete search history.

(56) References Cited

U.S. PATENT DOCUMENTS 5,757,399 A 5/1998 Murayama et al.
2005/0195252 A1 9/2005 Ishikawa et al.
(Continued)

FOREIGN PATENT DOCUMENTS

CN 1663798 A 9/2005
CN 1931588 A 3/2007
(Continued)

OTHER PUBLICATIONS

International Preliminary Report on Patentability issued in related international application PCT/JP2021/007857, Sep. 22, 2022.
(Continued)

*Primary Examiner* — Anh T Vo
(74) *Attorney, Agent, or Firm* — Merchant & Gould P.C.

(57) ABSTRACT

An inkjet recording device includes a first tray for supporting sheets, a storage body for storing ink, a head for ejecting ink, a platen positioned between the head and the first tray, and a first guide member. The platen is configured to support a first surface of the sheet conveyed rearward at a position below the head. The first guide member is positioned frontward of the head and has a first curved surface configured to guide the first surface of the sheet conveyed from the first tray toward the platen. The first guide member has a portion arranged in alignment with the storage body in a widthwise direction perpendicular to an up-down direction and a front-rear direction. The first guide member has a portion positioned at the same height as the storage body in the up-down direction.

15 Claims, 13 Drawing Sheets

(56) References Cited

U.S. PATENT DOCUMENTS

| | | | |
|---|---|---|---|
| 2006/0187288 A1* | 8/2006 | Nishida | B41J 2/1752 347/104 |
| 2009/0256884 A1 | 10/2009 | Aoki | |
| 2011/0050780 A1 | 3/2011 | Mizutani et al. | |
| 2011/0096127 A1 | 4/2011 | Ishibe et al. | |
| 2012/0069115 A1 | 3/2012 | Asada et al. | |
| 2012/0081445 A1 | 4/2012 | Tanahashi | |
| 2012/0286466 A1 | 11/2012 | Arakane | |
| 2013/0063520 A1 | 3/2013 | Muraki | |
| 2014/0036006 A1 | 2/2014 | Tamaki | |
| 2014/0168679 A1* | 6/2014 | Aoki | B41J 11/006 358/1.12 |
| 2014/0232801 A1 | 8/2014 | Kawamata et al. | |
| 2016/0185122 A1 | 6/2016 | Hirata et al. | |
| 2018/0178519 A1* | 6/2018 | Nishikawa | B05B 14/00 |
| 2018/0264833 A1 | 9/2018 | Namba | |
| 2019/0308425 A1 | 10/2019 | Otsuka et al. | |

FOREIGN PATENT DOCUMENTS

| | | | |
|---|---|---|---|
| CN | 101618633 | A | 1/2010 |
| CN | 102173202 | A | 9/2011 |
| CN | 102407687 | A | 4/2012 |
| CN | 102774672 | A | 11/2012 |
| CN | 102991137 | A | 3/2013 |
| CN | 203818752 | U | 9/2014 |
| JP | 3-234651 | A | 10/1991 |
| JP | 2005-262835 | A | 9/2005 |
| JP | 2011-51178 | A | 3/2011 |
| JP | 2011-205178 | A | 10/2011 |
| JP | 2012-76248 | A | 4/2012 |
| JP | 2014-28495 | A | 2/2014 |
| JP | 2016-124168 | A | 7/2016 |
| JP | 2018-153961 | A | 10/2018 |
| JP | 2019-64058 | A | 4/2019 |
| JP | 2019-177566 | A | 10/2019 |
| JP | 2019-182573 | A | 10/2019 |

OTHER PUBLICATIONS

International Search Report issued in corresponding International Patent Application No. PCT/JP2021/007857, mailed May 25, 2021.

Office Action issued in corresponding Chinese application 202180024217.4, Nov. 15, 2023.

Notice of Reasons for Refusal issued in corresponding Japanese application No. 2020-056529, Apr. 30, 2024.

Decision of Rejection issued in corresponding Chinese application No. 202180024217.4, Jul. 16, 2024.

* cited by examiner

INKJET RECORDING DEVICE INCLUDING GUIDE MEMBER WHOSE PORTION IS ALIGNED WITH AND AT THE SAME HEIGHT AS STORAGE BODY

REFERENCE TO RELATED APPLICATIONS

This is a by-pass continuation application of International Application No. PCT/JP2021/007857 filed on Mar. 2, 2021 which claims priority from Japanese Patent Application No. 2020-056529 filed on Mar. 26, 2020. The entire contents of the earlier applications are incorporated herein by reference.

BACKGROUND ART

There has been known an inkjet recording device configured to discharge a sheet onto an upper surface of a housing. One conventional inkjet recording device includes a sheet conveying passage configured of a first curved passage, a linear passage, and a second curved passage. The first curved passage extends diagonally upward and rearward from a rear end of a sheet tray and then is U-turned frontward at a rear end of the first curved passage. The linear passage extends frontward from the first curved passage. The second curved passage extends diagonally upward from a front end of the linear passage and then is U-turned backward to reach a sheet discharge opening positioned at the upper surface of the housing. When a sheet is conveyed along the linear passage, ink droplets are ejected from a head to the sheet, and the sheet is then discharged onto the upper surface of the inkjet recording device through the sheet discharge opening. Due to the existence of two curved passages extending upward, the inkjet recording device can reduce its installation area on a plane, while the vertical size of the inkjet recording device inevitably increases.

In this conventional inkjet recording device, the sheet is discharged rearward. That is, the sheet is configured to be discharged in a direction away from a user facing the inkjet recording device.

There is also known another conventional inkjet recording device that includes a sheet conveying passage whose construction is opposite to that of the above-described sheet conveying passage with respect to the front-rear direction. That is, in the other conventional inkjet recording device, a first curved passage extends diagonally upward and frontward from a front end of a sheet tray, and then is U-turned rearward. A linear passage extends rearward from the first curved passage. A second curved passage extends diagonally upward and rearward from a rear end of the linear passage and then is U-turned frontward. With this structure, the sheet is discharged frontward from the second curved passage onto the upper surface of the housing through a sheet discharge opening.

DESCRIPTION

According to the second conventional inkjet recording device, a main tank storing ink therein is positioned directly above the first curved passage. This arrangement of the main tank is not suitable for reducing the size of the inkjet recording device with respect to the vertical direction.

In view of the foregoing, it is an object of the disclosure to provide an inkjet recording device capable of suppressing an increase in size of the device in the vertical direction.

In order to attain the above and other object, the present disclosure provides an inkjet recording device including a first tray, a storage body, a head, a platen, and a first guide member. The first tray is configured to support a sheet. The sheet has a first surface and a second surface opposite each other. The storage body stores ink therein. The head is positioned above the first tray. The head includes nozzles through which the ink supplied from the storage body is configured to be ejected. The platen is positioned between the head and the first tray in an up-down direction. The platen is configured to support the first surface of the sheet conveyed rearward in a front-rear direction at a position below the head. The first guide member is positioned frontward of the head in the front-rear direction. The first guide member has a first curved surface configured to guide the first surface of the sheet conveyed from the first tray toward the platen. The first guide member has a portion arranged in alignment with the storage body in a widthwise direction perpendicular to the up-down direction and the front-rear direction. The first guide member has a portion positioned at the same height as the storage body in the up-down direction.

With this structure, the storage body is aligned with the first guide member in the widthwise direction. Accordingly, compared to a configuration where the storage body is positioned above the first guide member, the inkjet recording device can be made smaller with respect to the up-down direction.

Figure 13:
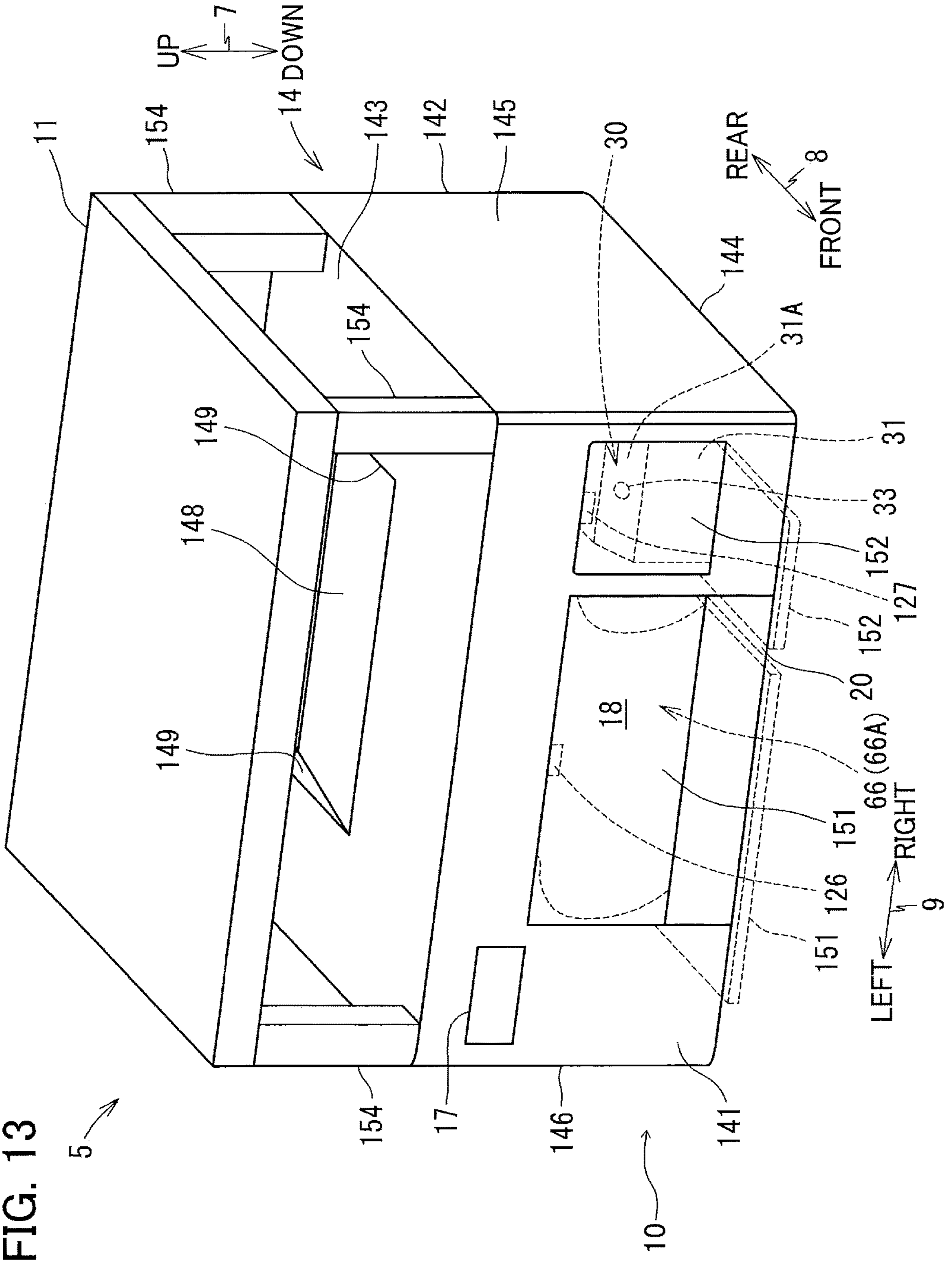

FIG. 13 is a perspective view of a multifunction device 5 including the printer 10 and a scanner unit 11 according to a seventh modification.

Hereinafter, a printer 10 as an example of an inkjet recording device according to one embodiment of the present disclosure will be described with reference to FIGS. 1 through 5.

In the following description, the top and bottom of the printer 10 (up-down direction 7) will be defined assuming that the printer 10 is disposed on a level surface so as to be operable (in an orientation illustrated in FIG. 1). Further, the front and rear sides of the printer 10 (front-rear direction 8) will be defined assuming that the surface at which an opening/closing cover 151 is provided serves as a front surface of the printer 10. The left and right sides of the printer 10 (left-right direction 9) will be defined assuming that the printer 10 is viewed from its front side. The up-down direction 7, the front-rear direction 8, and the left-right direction 9 are perpendicular to each other. In the present embodiment, the up-down direction 7 are vertical, and the front-rear direction 8 and left-right direction 9 are both horizontal.

<Overall Structure of Printer 10>

Figure 1:
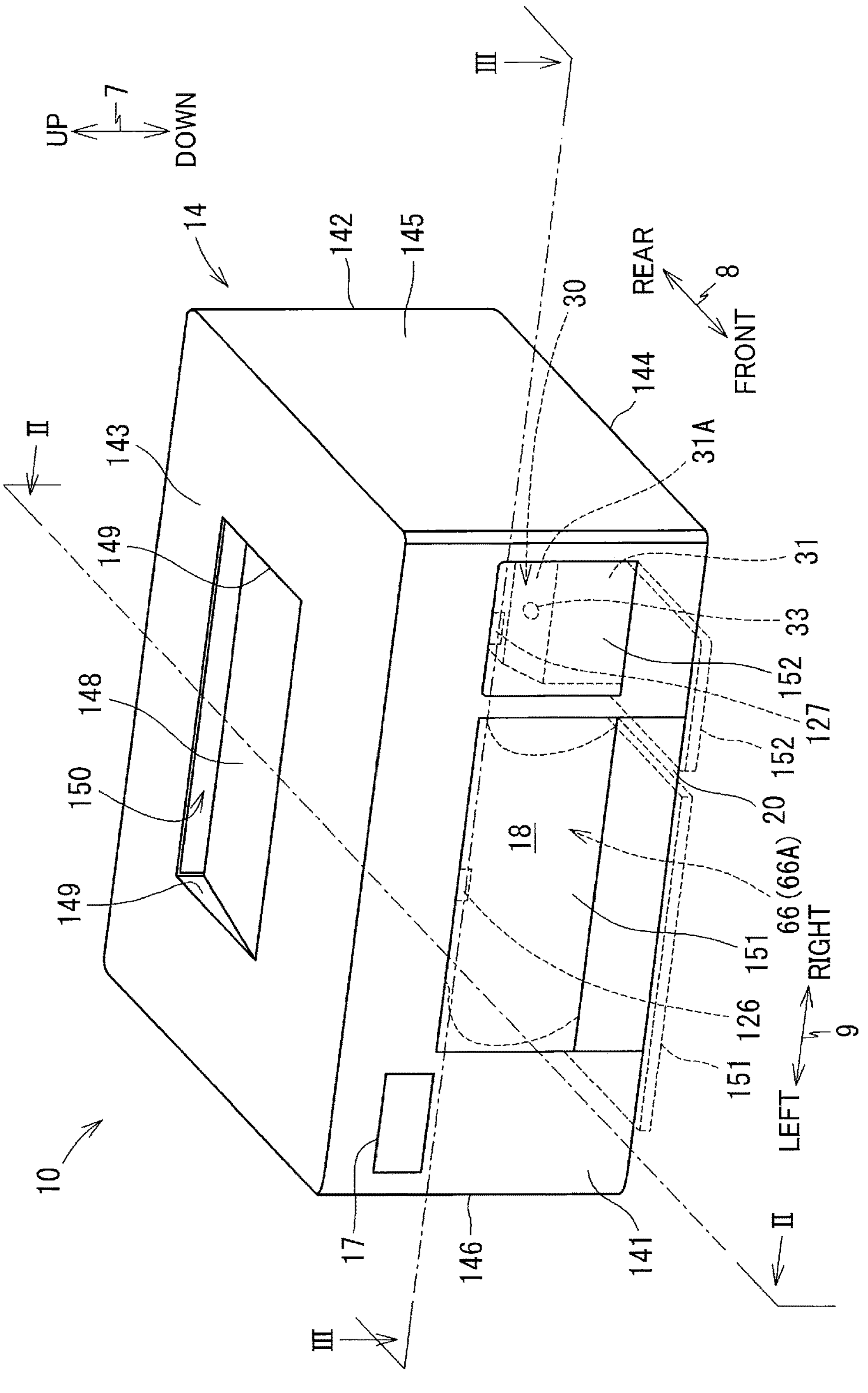
FIG. 1 is a perspective view of a printer 10 according to one embodiment.

The printer 10 illustrated in FIG. 1 is configured to record an image on a sheet of sheet 12 (see FIG. 2) using an inkjet recording system.

As illustrated in FIG. 1, the printer 10 includes a housing 14 having a generally rectangular parallelepiped shape. The housing 14 includes a front wall 141, a rear wall 142, a top wall 143, a bottom wall 144, a right wall 145, and a left wall 146. These walls 141-146 in combination define an internal space 13 (see FIG. 2) of the housing 14.

The top wall 143 includes a sloped wall 148. The sloped wall 148 extends in the left-right direction 9 to span at least a region corresponding to a width of a platen 42 (see FIGS. 2 and 3), i.e., the region spanning from a left end to a right end of the platen 42. Incidentally, in FIG. 3, a region defined between two one-dotted chain lines in the left-right direction 9 represents a sheet conveying passage 65 along which the sheet 12 is configured to be conveyed. That is, the sheet conveying passage 65 is defined as an area spanning between the left end and the right end of the platen 42 in the left-right direction 9.

Figure 2:
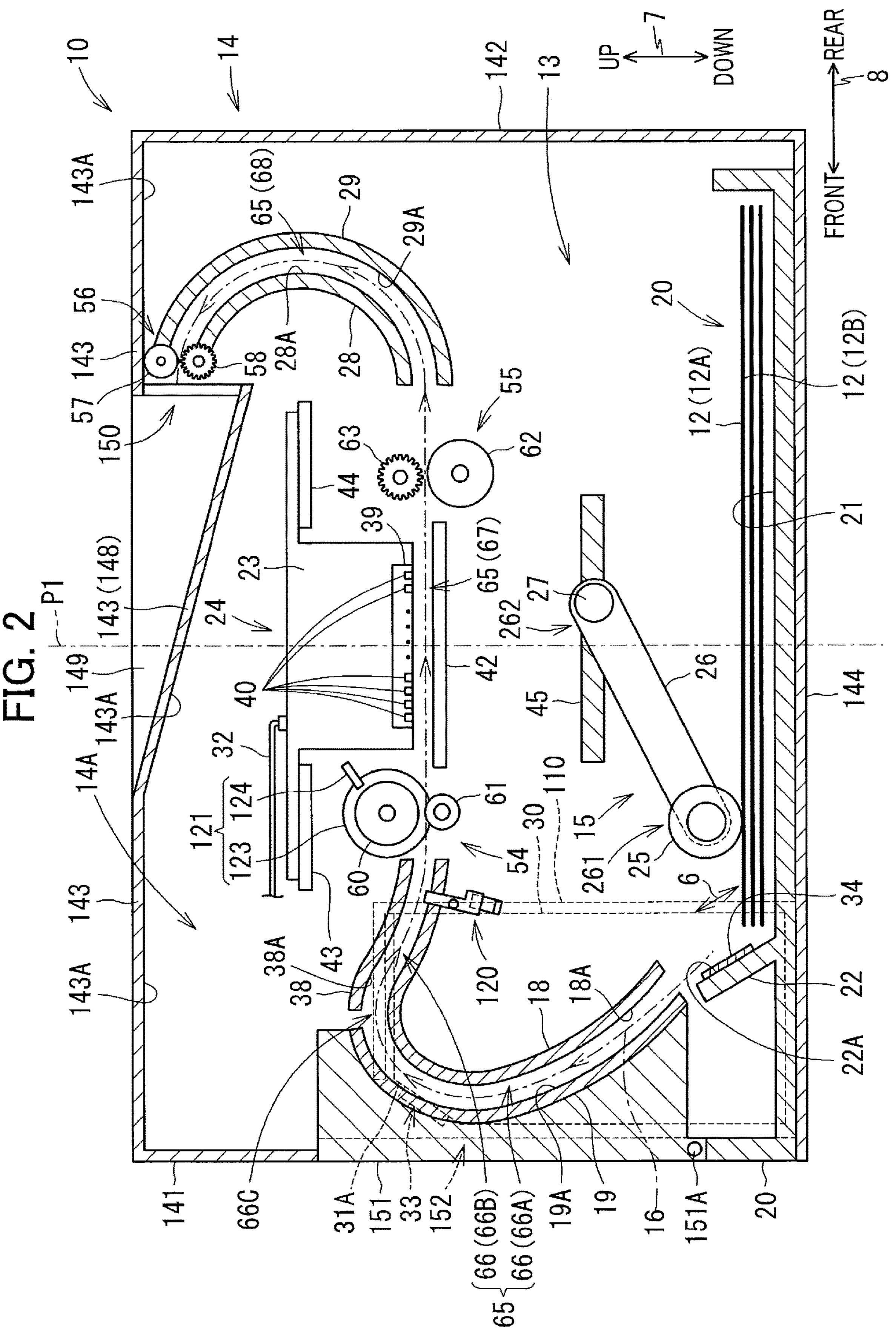
FIG. 2 is a vertical cross-sectional view of the printer 10 taken along a line II-II in FIG. 1.

As illustrated in FIGS. 1 and 2, the sloped wall 148 is inclined upward toward the front side of the housing 14. As illustrated in FIG. 1, a pair of side walls 149 extends upward each from a right end or a left end of the sloped wall 148. A remaining portion of the top wall 143 other than the sloped wall 148 extends in the front-rear direction 8 and the left-right direction 9. The sloped wall 148 has a rear end positioned below the remaining portion of the top wall 143, such that a stepped portion is provided between the rear end of the sloped wall 148 and the remaining portion of the top wall 143. In the stepped portion, an opening 150 opening frontward is formed. Further, the rear end of the sloped wall 148 and the opening 150 are positioned rearward of a recording unit 24 (described later). That is, the sloped wall 148 is positioned rearward of the recording unit 24 to extend diagonally upward and frontward from the opening 150. Incidentally, the opening 150 is positioned rearward of a front-rear center P1 (see FIG. 2) of the housing 14 in the front-rear direction 8.

As illustrated in FIG. 2, the top wall 143 defines a ceiling of the internal space 13 of the housing 14. The top wall 143 is positioned above the recording unit 24 (described later). In the present embodiment, the top wall 143 in its entirety is positioned above the recording unit 24. However, only a part of the top wall 143 (for example, a lower end of the sloped wall 148) may be positioned below the recording unit 24.

As illustrated in FIG. 1, two opening/closing covers 151, 152 are provided at the front wall 141.

Figure 3:
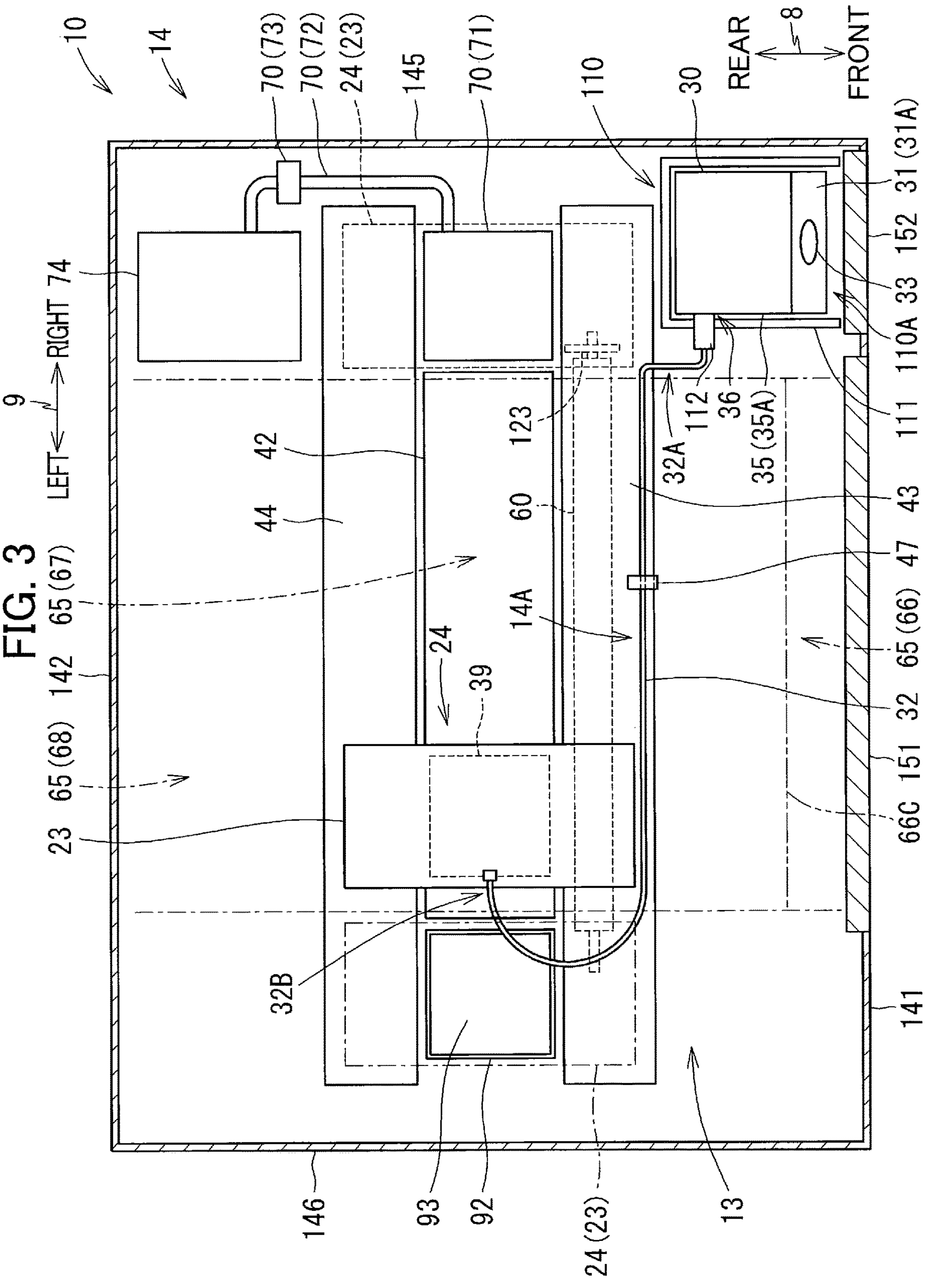
FIG. 3 is a transverse cross-sectional view of the printer 10 taken along a line III-III in FIG. 1.

The opening/closing cover 151 extends in the left-right direction 9 to at least span from the left end to the right end of the platen 42 (see FIGS. 2 and 3). The opening/closing cover 151 has a lower end portion provided with a pivot shaft 151A (see FIG. 2) extending in the left-right direction 9. The opening/closing cover 151 is pivotably supported by the front wall 141, such that the opening/closing cover 151 is pivotally movable about an axis of the pivot shaft 151A between a closed position (indicated by a solid line in FIG. 1) and an open position (indicated by a broken line in FIG. 1).

As illustrated in FIG. 2, the opening/closing cover 151 is provided with a guide member 19. The guide member 19 defines a first curved passage 66 constituting a part of a sheet conveying passage 65 in combination with guide members 18, 38, as will be described later. That is, the guide member 19 is pivotally movable along with the opening/closing cover 151. The guide member 19 constitutes the first curved passage 66 when the opening/closing cover 151 is at the closed position. At this time, a curved surface 18A of the guide member 18 (described later) is closed off from the outside. On the other hand, when the opening/closing cover 151 is at the open position, the first curved passage 66 is exposed to the outside of the housing 14. At this time, the curved surface 18A of the guide member 18 is exposed to the outside. Accordingly, a user can easily take out the sheet 12 jammed at the first curved passage 66.

As illustrated in FIG. 1, the opening/closing cover 152 is positioned rightward of the opening/closing cover 151. That is, the opening/closing cover 152 is positioned in a right end portion of the front wall 141. The opening/closing cover 152 has a lower end portion provided with a pivot shaft (not illustrated) extending in the left-right direction 9. The opening/closing cover 152 is pivotably supported by the front wall 141 so as to be pivotable about an axis of the pivot shaft.

As illustrated in FIG. 3, an accommodating portion 110 is positioned rearward of the opening/closing cover 152. That is, the accommodating portion 110 is positioned at a right front portion of the internal space 13 of the housing 14. The accommodating portion 110 is a box-like member which is open frontward. The accommodating portion 110 defines an internal space 110A therein in which a tank 30 (described later) is accommodated.

The opening/closing cover 152 is pivotally movable between a closed position (indicated by a solid line in FIG. 1) and an open position (indicated by a broken line in FIG. 1). The accommodating portion 110 and the tank 30 are closed off from the outside when the opening/closing cover 152 is at the closed position. The accommodating portion 110 and the tank 30 are exposed to the outside when the opening/closing cover 152 is at the open position.

As illustrated in FIG. 2, the printer 10 also includes a sheet supply tray 20, a sheet pick-up unit 15, a pair of first conveyor rollers 54, a pair of second conveyor rollers 55, a pair of third conveyor rollers 56, the recording unit 24, the platen 42, a sensor 120, a rotary encoder 121, a maintenance unit 70 (see FIG. 3), and an ink receiving unit 92 (see FIG. 3). The sheet pick-up unit 15, the pair of first conveyor rollers 54, the pair of second conveyor rollers 55, the pair of third conveyor rollers 56, the recording unit 24, the platen 42, the sensor 120, the rotary encoder 121, the maintenance unit 70, and the ink receiving unit 92 are disposed in the internal space 13 of the housing 14.

<Sheet Supply Tray 20>

As illustrated in FIGS. 1 and 2, the sheet supply tray 20 is configured to be inserted into and pulled out from the housing 14 through an opening formed in the front wall 141 at a position below the opening/closing cover 151. Specifically, the sheet supply tray 20 is inserted rearward through the opening for attachment to the housing 14, and is pulled out frontward through the opening for detachment from the housing 14.

As illustrated in FIG. 2, the sheet supply tray 20 has a box-like shape that is open upward. The sheet supply tray 20 has a bottom surface 21 for supporting a stack of sheets 12 thereon.

The sheet supply tray 20 includes an inclined wall 22 extending diagonally upward and frontward from a front end portion of the bottom surface 21. This direction in which the inclined wall 22 extends (slopes) will be referred to as a sloping direction 6 perpendicular to the left-right direction 9. The inclined wall 22 has a rear surface 22A on whose center portion in the left-right direction 9 a separation portion 34 is provided. The separation portion 34 is configured to separate an uppermost sheet 12 from remaining sheets 12 that come into contact with the separation portion 34. To this effect, the separation portion 34 includes a plurality of teeth arrayed in the sloping direction 6 on the rear surface 22A therealong. Incidentally, the separation portion 34 may have a configuration other than the array of teeth, provided that the separation portion 34 can separate the uppermost sheet 12. For example, the separation portion 34 may be constituted by a cork instead of the array of teeth.

<Sheet Pick-Up Unit 15>

As illustrated in FIG. 2, the sheet pick-up unit 15 includes a pick-up roller 25, a pick-up arm 26, and a shaft 27.

The pick-up roller 25 is rotatably supported by a free end portion 261 of the pick-up arm 26. The pick-up roller 25 makes contact with the sheet 12 from above in a state where the sheet 12 is mounted on the sheet supply tray 20, while the pick-up roller 25 contacts the bottom surface 21 of the sheet supply tray 20 in a state where no sheet 12 is mounted on the sheet supply tray 20.

The pick-up arm 26 has a base end portion 262 (opposite the free end portion 261) positioned rearward of and above the free end portion 261. The shaft 27 extends from the base end portion 262 and is rotatably supported by a frame 45 fixed to the housing 14. Hence, the pick-up arm 26 is pivotally movable about an axis of the shaft 27 provided at the base end portion 262.

Figure 5:
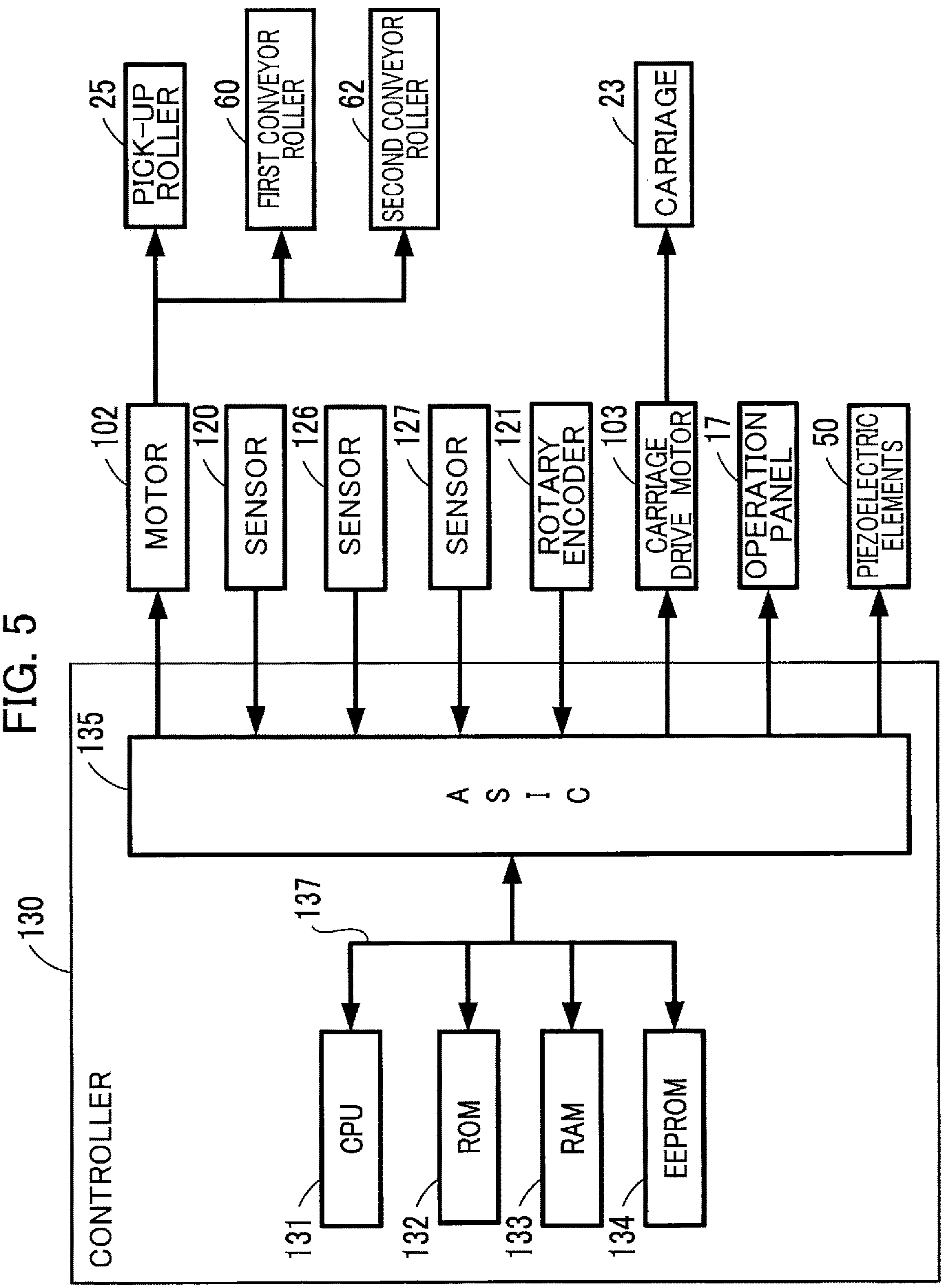
FIG. 5 is a functional block diagram of the printer 10.

The pick-up roller 25 is configured to rotate upon receipt of a driving force from a motor 102 (see FIG. 5). Hence, the pick-up roller 25 conveys the sheet 12 supported on the sheet supply tray 20 frontward and supplies the sheet 12 to the first curved passage 66 of the sheet conveying passage 65.

When conveyed by the pick-up roller 25, a leading edge of the sheet 12 or leading edges of a plurality of the sheets 12 abuts on the plurality of teeth of the separation portion 34. In a case where the leading edges of the sheets 12 abut on the plurality of teeth, the uppermost sheet 12 in contact with the pick-up roller 25 is separated from the remaining sheets 12 by the separation portion 34. Hence, only the uppermost sheet 12 is conveyed to the first curved passage 66.

The sheet 12 conveyed to the sheet conveying passage 65 is configured to be conveyed along the sheet conveying passage 65 in a conveying direction 16 indicated by a one-dotted chain line in FIG. 2. The sheet 12 fed from the sheet supply tray 20 is then conveyed toward the pair of first conveyor rollers 54 positioned at the sheet conveying passage 65.

<Sheet Conveying Passage 65>

As illustrated in FIG. 2, the sheet conveying passage 65 is provided in the internal space 13 of the housing 14. The sheet conveying passage 65 is for conveying the sheet 12 therealong. The sheet conveying passage 65 is defined as a combination of: a space between the guide members 18 and 19; a space between the recording unit 24 and the platen 42; and a space between guide members 28 and 29 facing and spaced away from each other by a predetermined distance.

Specifically, the sheet conveying passage 65 includes the first curved passage 66, a linear passage 67, and a second curved passage 68.

The first curved passage 66 is provided in a front portion of the internal space 13 of the housing 14. The first curved passage 66 extends from the front end of the sheet supply tray 20 to the pair of first conveyor rollers 54. The first curved passage 66 is defined by the guide member 18 and guide members 19, 38. The guide members 19 and 38 face the guide member 18 to be spaced away therefrom by a predetermined distance.

The guide member 18 is positioned frontward of the recording unit 24. The guide member 18 has the curved surface 18A that is curved to be convex frontward. The guide member 19 is positioned frontward of the guide member 18. The guide member 19 has a curved surface 19A that is curved to be concave frontward. The guide member 38 is positioned above the guide member 18 and between the guide member 19 and the recording unit 24. The guide member 38 has a curved surface 38A extending diagonally rearward and downward toward the pair of first conveyor rollers 54.

The sheet 12 has two opposing surfaces, namely, a first surface 12A and a second surface 12B. The curved surface 18A is configured to guide the first surface 12A of the sheet 12 conveyed from the sheet supply tray 20 to the pair of first conveyor rollers 54. The first surface 12A of the sheet 12 is a surface facing upward when the sheet 12 is supported on the sheet supply tray 20. The first surface 12A also faces the platen 42 and is supported by the platen 42 when the sheet 12 is positioned between the recording unit 24 and the platen 42.

The curved surfaces 19A and 38A are configured to guide the second surface 12B of the sheet 12 conveyed from the sheet supply tray 20 to the pair of first conveyor rollers 54. The second surface 12B of the sheet 12 is a surface facing downward when the sheet 12 is supported on the sheet supply tray 20. The second surface 12B also faces the recording unit 24 from below so that the recording unit 24 can eject ink droplets on the second surface 12B when the sheet 12 is positioned between the recording unit 24 and the platen 42.

The first curved passage 66 is configured of a first pathway 66A and a second pathway 66B. The first pathway 66A extends upward and frontward from the front end of the sheet supply tray 20, and then makes a U-turn toward the rear. The first pathway 66A is defined by the guide member 18 and guide member 19. The first pathway 66A has one end continuous with the front end of the sheet supply tray 20. Hence, the sheet 12 supported on the sheet supply tray 20 can be conveyed to the first pathway 66A by the pick-up roller 25. The first pathway 66A has another end continuous with the second pathway 66B.

The second pathway 66B extends diagonally downward and rearward from the other end of the first pathway 66A. The second pathway 66B is defined by the guide members 18 and guide member 38. The second pathway 66B has one end continuous with the other end of the first pathway 66A. The first pathway 66A and the second pathway 66B define a boundary therebetween at an uppermost end 66C of the first curved passage 66. The second pathway 66B has another end continuous with the linear passage 67.

The linear passage 67 is provided in a center portion of the internal space 13 of the housing 14. The linear passage 67 is positioned above the sheet supply tray 20. The linear passage 67 faces a lower surface 143A of the top wall 143 of the housing 14 in the up-down direction 7. The linear passage 67 is defined by the recording unit 24 and the platen 42. The linear passage 67 extends rearward from the other end of the first curved passage 66 (the second pathway 66B) and is positioned between the first conveyor roller pair 54 and the second conveyor roller pair 55. The linear passage 67 has a front end continuous with the other end of the first curved passage 66, and a rear end continuous with the second curved passage 68.

The second curved passage 68 is provided in a rear portion of the internal space 13 of the housing 14. The second curved passage 68 extends rearward from the rear end of the linear passage 67, and then is curved upward and frontward to reach the opening 150. The second curved passage 68 has one end continuous with the rear end of the linear passage 67, and another end continuous with the opening 150. The second curved passage 68 is defined by the guide member 28 and the guide member 29. The guide members 28 and 29 face each other and are spaced apart from each other by a predetermined distance.

The guide member 28 is positioned rearward of the recording unit 24. The guide member 28 has a curved surface 28A that is curved to be convex rearward. The guide member 29 is positioned rearward of the guide member 28. The guide member 29 has a curved surface 29A that is curved to be concave rearward.

The curved surface 28A is configured to guide the second surface 12B of the sheet 12 conveyed from the platen 42 to the opening 150. The curved surface 29A is configured to guide the first surface 12A of the sheet 12 conveyed from the platen 42 to the opening 150.

<First Conveyor Roller Pair 54, Second Conveyor Roller Pair 55, and Third Conveyor Roller Pair 56>

As illustrated in FIG. 2, the pair of first conveyor rollers 54 is positioned frontward of the recording unit 24 at the linear passage 67. The pair of first conveyor rollers 54 includes a first conveyor roller 60 and a pinch roller 61 facing each other. The first conveyor roller 60 is configured to rotate upon receipt of the driving force from the motor 102 (see FIG. 5). The pinch roller 61 is configured to rotate following the rotation of the first conveyor roller 60.

The pair of second conveyor rollers 55 is positioned rearward of the recording unit 24 at the linear passage 67. That is, the pair of second conveyor rollers 55 is positioned downstream of the pair of first conveyor rollers 54 in the conveying direction 16. The pair of second conveyor rollers 55 includes a second conveyor roller 62 and a spur roller 63 facing each other. The second conveyor roller 62 is configured to rotate upon receipt of the driving force from the motor 102 (see FIG. 5). The spur roller 63 is configured to rotate following the rotation of the second conveyor roller 62.

The pair of third conveyor rollers 56 is positioned adjacent to the opening 150 at the second curved passage 68. The pair of third conveyor rollers 56 includes a third conveyor roller 57 and a spur roller 58 facing each other. The third conveyor roller 57 is configured to rotate upon receipt of the driving force from the motor 102 (see FIG. 5). The spur roller 58 is configured to rotate following the rotation of the third conveyor roller 57.

Incidentally, in the present embodiment, the motor 102 serves as a common drive source for the first conveyor roller 60, the second conveyor roller 62, the third conveyor roller 57 and the pick-up roller 25. However, the respective conveyor rollers 60, 62, 57 and the pick-up roller 25 need not be driven by a single motor, but may be driven by different motors.

The pair of first conveyor rollers 54, the pair of second conveyor rollers 55, and the pair of third conveyor rollers 56 are respectively configured to nip the sheet 12 to convey the sheet 12 in the conveying direction 16. That is, the first conveyor roller pair 54 is configured to convey the sheet 12 toward the platen 42, the second conveyor roller pair 55 is configured to convey the sheet 12 toward the pair of third conveyor rollers 56, and the third conveyor roller pair 56 is configured to discharge the sheet 12 to the sloped wall 148 through the opening 150.

The sheet 12 supported on the sheet supply tray 20 is conveyed to the first curved passage 66 by the pick-up roller 25, and is then conveyed toward the pair of first conveyor rollers 54 along the first curved passage 66. When the leading edge of the sheet 12 (the downstream end of the sheet 12 in the conveying direction 16) reaches the pair of first conveyor rollers 54, the first conveyor roller pair 54 nips the sheet 12 therebetween to convey the sheet 12 in the conveying direction 16 (rearward) along the linear passage 67. When the leading edge of the sheet 12 reaches the pair of second conveyor rollers 55, the second conveyor roller pair 55 nips the sheet 12 therebetween to convey the sheet 12 in the conveying direction 16 along the second curved passage 68. When the leading edge of the sheet 12 reaches the pair of third conveyor rollers 56, the third conveyor roller pair 56 nips the sheet 12 therebetween to convey the sheet 12 in the conveying direction 16 (frontward). The sheet 12 conveyed by the pair of third conveyor rollers 56 is discharged onto the sloped wall 148 of the top wall 143 through the opening 150. That is, the opening 150 allows the sheet 12 conveyed by the pair of third conveyor rollers 56 to be discharged frontward. In a case where a preceding sheet 12 is placed on the sloped wall 148, a subsequent sheet 12 discharged toward the sloped wall 148 is mounted on top of the preceding sheet 12 supported on the sloped wall 148.

<Recording Unit 24>

As illustrated in FIG. 2, the recording unit 24 is positioned above the sheet supply tray 20. The recording unit 24 constitutes an upper end of the linear passage 67. The recording unit 24 is positioned between the pair of first conveyor rollers 54 and the pair of second conveyor rollers 55 in the conveying direction 16.

The recording unit 24 is positioned above the platen 42 to face the same. The platen 42 constitutes a lower end of the linear passage 67. That is, the platen 42 is positioned between the recording unit 24 and the sheet supply tray 20 in the up-down direction 7. The platen 42 is configured to support the first surface 12A of the sheet 12 from below.

The recording unit 24 includes a carriage 23 and a head 39.

As illustrated in FIG. 3, an ink tube 32 extends from the carriage 23. The ink tube 32 is connected to the tank 30 for supplying ink stored in the tank 30 to the head 39. The carriage 23 is movably supported by guide rails 43, 44 constituting a part of the frame 45 of the printer 10 (see FIG. 2).

The guide rails 43, 44 extend in the left-right direction 9 and are positioned apart from each other in the front-rear direction 8. The guide rail 43 is positioned frontward of the head 39. The guide rail 44 is positioned rearward of the head 39. The carriage 23 is connected to a well-known belt driving mechanism (not illustrated) provided on the guide rail 43 or 44. An endless belt of the belt driving mechanism is circularly movable upon receipt of a driving force from a carriage drive motor 103 (see FIG. 5). The carriage 23 is reciprocatingly movable with respect to the left-right direction 9 by the circular movement of the endless belt.

The carriage 23 is movable not only across an entire widthwise range of the linear passage 67 in the left-right direction 9, but also beyond the entire widthwise range of the linear passage 67 in the left-right direction 9. Specifically, the carriage 23 is movable between a rightmost position (indicated by a broken line in FIG. 3) and a leftmost position (indicated by a one-dotted chain line in FIG. 3) in the left-right direction 9. At the rightmost position, the carriage 23 is positioned outward (rightward) relative to a right end of the linear passage 67. At the leftmost position, the carriage 23 is positioned outward (leftward) relative to a left end of the linear passage 67.

As illustrated in FIG. 2, the head 39 is mounted on the carriage 23. The head 39 includes a sub-tank (not illustrated), a plurality of nozzles 40, an ink channel (not illustrated), and piezoelectric elements 50 (see FIG. 5).

The sub-tank is configured to receive the ink supplied from the tank 30 through the ink tube 32. The plurality of nozzles 40 is open at a lower surface of the head 39. The ink channel connects the sub-tank to the plurality of nozzles 40. The piezoelectric elements 50 are configured to deform a part of the ink channel to eject ink droplets from the plurality of nozzles 40. The piezoelectric elements 50 are configured to be actuated when powered through a control by a controller 130 (see FIG. 5). The controller 130 is configured to control various operations of the printer 10. Ink droplets are ejected through the plurality of nozzles 40 by the actuation of the piezoelectric elements 50. Specifically, the head 39 is configured to eject ink droplets onto the sheet 12 supported on the platen 42 while the carriage 23 is moving over the platen 42, thereby recording an image on the sheet 12.

<Sensor 120>

As illustrated in FIG. 2, the sensor 120 is positioned at the first curved passage 66 of the sheet conveying passage 65. The sensor 120 is a conventional sensor configured to detect presence of the sheet 12 at the position of the sensor 120. The sheet 12 conveyed by the pick-up roller 25 moves past the sensor 120 and reaches the pair of first conveyor rollers 54. The sensor 120 is configured to output, to the controller 130, a high level signal or a low level signal (a low level signal in the present embodiment) in response to the detection of the sheet 12 at the position of the sensor 120. The sensor 120 is also configured to output, to the controller 130, a high level signal or a low level signal (a high level signal in the present embodiment) in response to the non-detection of the sheet 12 at the position of the sensor 120.

<Rotary Encoder 121>

As illustrated in FIG. 2, the printer 10 includes the well-known rotary encoder 121 configured to generate pulse signals according to a rotation amount of the first conveyor roller 60. The rotary encoder 121 includes an encoder disc 123 and an optical sensor 124. The encoder disc 123 is attached to the first conveyor roller 60 and is rotatable together with the rotation of the first conveyor roller 60. The optical sensor 124 is configured to read the rotating encoder disc 123 and generate pulse signals, and transmit the pulse signals to the controller 130. The controller 130 is configured to determine the rotation amount of the first conveyor roller 60 based on the pulse signals inputted into the controller 130. That is, the rotary encoder 121 is configured to measure the rotation (rotation amount) of the first conveyor roller 60. Further, the controller 130 is configured to determine the position of the sheet 12 at the sheet conveying passage 65 based on the signals inputted from the sensor 120 and the pulse signals inputted from the rotary encoder 121.

As illustrated in FIG. 3, the encoder disc 123 is attached to the right end portion of the first conveyor roller 60. The right end portion of the first conveyor roller 60 is positioned rightward of the platen 42. That is, the encoder disc 123 is positioned rightward of the right end of the platen 42. Incidentally, the encoder disc 123 may be positioned leftward of the left end of the platen 42.

<Sensor 126>

As indicated by a broken line in FIG. 1, the printer 10 further includes a sensor 126 attached to the housing 14. The sensor 126 is positioned rearward of the opening/closing cover 151 at the closed position. The sensor 126A may be a conventional optical sensor or a conventional mechanical sensor. The opening/closing cover 151 can contact the sensor 126 from its front side while the opening/closing cover 151 is at the closed position. At this time, the sensor 126 is configured to output a high level signal or a low level signal (a high level signal in the present embodiment) to the controller 130. On the other hand, the opening/closing cover 151 is separated from the sensor 126 while the opening/closing cover 151 is at the open position. At this time, the sensor 126 is configured to output a high level signal or a low level signal (in the present embodiment, a low level signal) to the controller 130.

<Sensor 127>

As indicated by a broken line in FIG. 1, the printer 10 further includes a sensor 127 attached to the housing 14. The sensor 127 is positioned rearward of the opening/closing cover 152 at the closed position. The sensor 127 may be a conventional optical sensor or a conventional mechanical sensor. The opening/closing cover 152 can contact the sensor 127 from its front side while the opening/closing cover 152 is at the closed position. At this time, the sensor 127 is configured to output a high level signal or a low level signal (in the present embodiment, a high level signal) to the controller 130. On the other hand, the opening/closing cover 152 is separated from the sensor 127 when the opening/closing cover 152 is at the open position. At this time, the sensor 127 is configured to output a high level signal or a low level signal (in the present embodiment, a low level signal) to the controller 130.

<Controller 130>

As illustrated in FIG. 5, the controller 130 includes a CPU 131, a ROM 132, a RAM 133, an EEPROM 134, and an ASIC 135 all of which are interconnected via an internal bus 137. The ROM 132 stores therein programs for enabling the CPU 131 to control various operations to be performed in the printer 10. The RAM 133 is used as a memory region to temporarily store data and signals used by the CPU 131 for executing the programs, or a working region for data processing. The EEPROM 134 stores settings and flags, and the like which should be stored even after shutting off of the printer 10.

The motor 102 and the carriage drive motor 103 are connected to the ASIC 135. The ASIC 135 is configured to generate drive signals for rotating the motor 102 and the carriage drive motor 103 so as to control the rotations of the motor 102 and the carriage drive motor 103 according to the drive signals. The motor 102 and the carriage drive motor 103 are configured to rotate in a normal direction or in a reverse direction in response to the drive signals from the ASIC 135. For example, the controller 130 is configured to control the rotation of the motor 102 to rotate the rollers 25, 60 and 62. Further, the controller 130 is configured to control the rotation of the carriage drive motor 103 to control the reciprocating movement of the carriage 23 in the left-right direction 9

Further, the sensors 120, 126, 127 and the rotary encoder 121 are connected to the ASIC 135. The controller 130 is configured to determine whether the sheet 12 is located at the position of the sensor 120 on the basis of the detection signal outputted from the sensor 120. Further, the controller 130 is configured to determine the position of the opening/closing cover 151 on the basis of the detection signal outputted from the sensor 126. Further, the controller 130 is configured to determine the position of the opening/closing cover 152 on the basis of the detection signal outputted from the sensor 127. Further, the controller 130 is configured to determine the location of the sheet 12 on the basis of the detection signal outputted from the sensor 120 and the pulse signals outputted from the rotary encoder 121.

Further, the piezoelectric elements 50 are connected to the ASIC 135. The controller 130 is configured to control power supply to the piezoelectric elements 50 through a driver circuit (not illustrated) for driving the piezoelectric elements 50. The controller 130 is configured to control power supply to the piezoelectric elements 50 to selectively ejects ink droplets through the plurality of nozzles 39.

Further, the printer 10 further includes an operation panel 17 which is also connected to the ASIC 135. As illustrated in FIG. 1, the operation panel 17 is provided on the front wall 141 of the housing 14. The operation panel 17 is used for enabling the user to inputs various commands to operate the printer 10 and to determine various settings. Further, the operation panel 17 is configured to display various information. Incidentally, the operation panel 17 need not be positioned on the front wall 141, but may be positioned on the top wall 143 of the housing 14, for example.

The controller 130 is configured to output an alarm signal to the operation panel 17 when determining that both the opening/closing cover 151 and the opening/closing cover 152 are at open position. The alarm signal is a signal to make the operation panel 17 display thereon information prompting closure of the opening/closing cover 151, i.e., prompting the opening/closing cover 151 to move from the open position to the closed position. In response to acquisition of the alarm signal, the operation panel 17 is configured to display the information prompting the closure of the opening/closing cover 151. In the embodiment, the operation panel 17 serves as an example of an alarm part of the disclosure.

The above alarming may not be performed through the operation panel 17. For example, the alarming may be performed through lighting of an LED provided in the printer 10. In this case, the LED serves as another example of the "alarm part" of the disclosure. Alternatively, the printer 10 may include a speaker to perform the alarming. In this case, the controller 130 may be configured to output the alarm signal to the speaker, so that the speaker can output a voice message or a beep sound prompting the closure of the opening/closing cover 151.

<Tank 30>

The tank 30 indicated by broken lines in FIG. 1 is a container for storing ink therein. The tank 30 has a shape of rectangular parallelepiped, and provides an internal space in which the ink is stored. Incidentally, the tank 30 may have various shapes other than the rectangular parallelepiped.

In the present embodiment, a single tank 30 is accommodated in the accommodating portion 110, and black ink is stored in the tank 30. However, the tank 30 may store ink of a color other than black.

As illustrated in FIGS. 1 and 3, the tank 30 is accommodated in the accommodating portion 110. The accommodating portion 110 is positioned below the guide rail 43.

As illustrated in FIG. 3, the accommodating portion 110 is positioned rightward of the platen 42. That is, the accommodating portion 110 is positioned rightward of the right end of the platen 42. Further, as illustrated in FIGS. 1 and 2, the accommodating portion 110 and the tank 30 accommodated in the accommodating portion 110 are positioned frontward of the head 39, and are positioned rightward of and beside the guide member 18. The accommodating portion 110 and tank 30 are positioned within a region in the up-down direction 7 defined between an upper end and the lower end of the tank 30. The accommodating portion 110 and the tank 30 are indicated by broken lines in FIG. 2. In FIG. 2, the accommodating portion 110 and the tank 30 are positioned at the nearer side (closer to the viewer who is facing the sheet of FIG. 2) than the guide member 18. The tank 30 in its entirety is positioned within the region in the up-down direction 7 defined between the upper and lower ends of the tank 30. However, only a part of the tank 30 may be positioned within the region in the up-down direction 7.

Further, the tank 30 and the encoder disc 123 are both positioned rightward of the platen 42. In other words, of left and right side spaces provided outward of the platen 42 in the left-right direction 9, the tank 30 and the encoder disc 123 are positioned in the same side space (in the present embodiment, in the right side space relative to the platen 42). That is, the tank 30 and the encoder disc 123 are positioned at the same side in the left-right direction 9 with respect to the platen 42. Incidentally, the accommodating portion 110 may be positioned leftward of the platen 42.

Further, the accommodating portion 110 and the tank 30 are positioned outward of the encoder disc 123 in the left-right direction 9. In the present embodiment, the accommodating portion 110 and the tank 30 are positioned rightward of the encoder disc 123. Incidentally, in a case where the accommodating portion 110 and the encoder disc 123 are positioned leftward of the sheet conveying passage 65, the accommodating portion 110 and the tank 30 are positioned leftward of the encoder disc 123. That is, the encoder disc 123 is positioned between the platen 42 and the accommodating portion 110 (i.e., between the platen 42 and the tank 30) in the left-right direction 9.

Further, the accommodating portion 110 and the tank 30 are positioned frontward of the first conveyor roller 60. Incidentally, the accommodating portion 110 and the tank 30 need not be positioned frontward of the first conveyor roller 60. For example, at least a part of the accommodating portion 110 and the tank 30 may be positioned rearward of the first conveyor roller 60.

As illustrated in FIGS. 1 and 2, the tank 30 includes a front wall 31 whose upper portion is inclined diagonally upward and rearward to provide an inclined wall 31A. A supply port 33 is formed at the inclined wall 31A. The supply port 33 is positioned frontward of the first conveyor roller 60. Further, the supply port 33 is positioned below the uppermost end 66C of the first curved passage 66. That is, the supply port 33 is positioned below the uppermost ends of the guide members 18, 19 and 38. Further, the supply port 33 is positioned above the separation portion 34.

The supply port 33 is a through-hole providing communication between the internal space of the tank 30 and the outside. The supply port 33 is exposed to the outside when the opening/closing cover 152 is at the open position. In this state, an ink container bottle filled with ink is inserted in the supply port 33 to replenish the tank 30 with ink.

Incidentally, the supply port 33 need not be formed in the inclined wall 31A, but may be formed in an upper wall of the tank 30. In this case, an ink container bottle may be connected to the supply port 33 from above. To this effect, an opening/closing cover is arranged at the top wall 143 of the housing 14 at a location directly above the supply port 33.

The tank 30 includes a left wall 35 whose lower portion is formed with a discharge hole 36. The discharge hole 36 is a through-hole extending throughout a thickness of the left wall 35 in the left-right direction 9. The left wall 35 has a left surface 35A where one end of the discharge hole 36 is open. The discharge hole 36 allows the internal space of the tank 30 to communicate with the outside. The discharge hole 36 is positioned frontward of the guide rail 43.

The accommodating portion 110 includes a left wall 111 through which a connection tube 112 extends. The connection tube 112 is positioned frontward of the encoder disc 123.

The connection tube 112 has one end (inner end) positioned inside the accommodating portion 110 and another end (outer end) positioned outside of the left wall 111. The one end of the connection tube 112 is connected to the discharge hole 36 of the tank 30. That is, the connection tube 112 is provided at the left surface 35A of the left wall 35 of the tank 30. The other end (outer end) of the connection tube 112 is connected to the ink tube 32. With this structure, the internal space of the tank 30 and the ink tube 32 is in fluid communication with each other through the connection tube 112.

Incidentally, in the present embodiment, the connection tube 112 is employed as a connecting member to connect the tank 30 to the ink tube 32. Alternatively, instead of the connection tube 112, any connecting member may be available, provided that the member has a function to connect the tank 30 to the ink tube 32.

<Ink Tube 32>

As illustrated in FIG. 3, the ink tube 32 has one end 32A connected to the tank 30 through the connection tube 112, and another end 32B connected to the recording unit 24. Specifically, the other end 32B is connected to the plurality of nozzles 40 through the sub-tank and the ink channel of the head 39.

The ink tube 32 extends upward from the connection tube 112 up to a position above the guide rail 43, and then is bent and extends rearward to a position above the upper surface of the guide rail 43. The ink tube 32 is then bent and extends leftward at the position above the upper surface of the guide rail 43. The ink tube 32 is fixed to the guide rail 43 by a fixing member 47 positioned at a center portion in the left-right direction 9 of the upper surface of the guide rail 43. A clip is used as the fixing member 47 in the present embodiment. Any well-known member is available as the fixing member 47 to fix the ink tube 32 to the guide rail 43, for example, a member which nips the ink tube 32 between the fixing member and the guide rail 43.

The ink tube 32 has a generally U-shaped portion which extends leftward from the fixing member 47 and then makes a U-turn rightward to the recording unit 24. The U-shaped portion is not fixed to any components in the housing 14. Hence, the U-shaped portion of the ink tube 32 is freely movable and flexible, so that this U-shaped portion is deformable in accordance with the movement in the left-right direction 9 of the carriage 23.

The ink tube 32 has a portion extending in the left-right direction 9 and positioned above the guide rail 43. The portion of the ink tube 32 is connected to the recording unit 24 through a specific space 14A (illustrated in FIG. 2) which is a part of the internal space 13 of the housing 14 positioned frontward of the recording unit 24.

Further, the ink tube 32 is positioned rearward of the uppermost end 66C of the first curved passage 66. The uppermost end 66C is indicated by a two-dotted chain line in FIG. 3. The ink tube 32 is connected to the recording unit 24 without passing through the space in front of the uppermost end 66C of the first curved passage 66.

<Maintenance Unit 70>

As illustrated in FIG. 3, the printer 10 includes the maintenance unit 70. The maintenance unit 70 is configured to perform maintenance to the head 39. Specifically, the maintenance unit 70 is configured to perform a purging operation to suck out ink and air within the plurality of nozzles 40 and foreign materials deposited on the surface where the plurality of nozzles 40 is open (i.e., the lower surface of the head 39). In the following description, the ink and air within the nozzles 40 and the foreign materials deposited on the nozzle surface of the head 39 will be referred to collectively as "ink and the like." The printer 10 further includes a waste tank 74 configured to store ink and the like sucked and removed by the maintenance unit 70.

The maintenance unit 70 is positioned below the moving path of the carriage 23 and outward of the platen 42 and guide member 18 in the left-right direction 9. In the present embodiment, the maintenance unit 70 is positioned rightward of the right ends of the platen 42 and the guide member 18. However, the maintenance unit 70 may be positioned leftward of the left ends of the platen 42 and the guide member 18. Further, the maintenance unit 70 is positioned rearward of the first conveyor roller 60.

Figure 4:
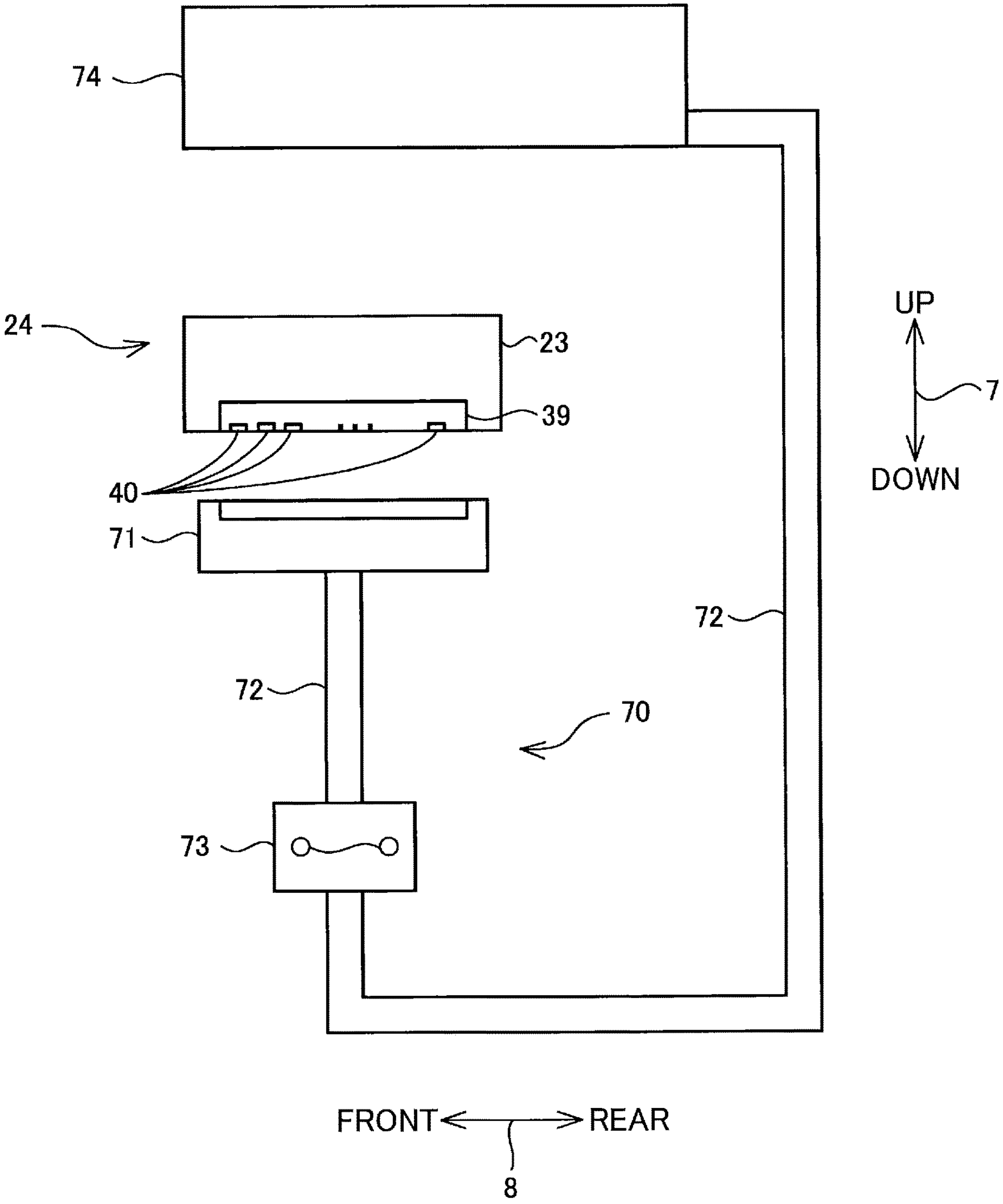
FIG. 4 is a schematic view illustrating a maintenance unit 70 of the printer 10.

As illustrated in FIG. 4, the maintenance unit 70 includes a cap 71, a tube 72, and a pump 73.

The cap 71 is made from rubber. The cap 71 is positioned to face the head 39 when the carriage 23 is at the rightmost position (see FIG. 3). The tube 72 extends from the cap 71 to the waste tank 74 through the pump 73. The pump 73 is a rotary-type tube pump, for example. The pump 73 is actuated by a motor (not illustrated) to suck the ink and the like in the plurality of nozzles 40 through the cap 71 and the tube 72, and to discharge the ink and the like to the waste tank 74 through the tube 72. That is, the cap 71 is configured to receive ink discharged from the head 39 and to discharge the received ink to the waste tank 74.

The cap 71 is movable between a capping position and an uncapping position away from each other in the up-down direction 7. At the capping position, the cap 71 abuts on the head 39 to cover the lower surface of the head 39 when the carriage 23 is at the rightmost position. That is, the cap 71 at its capping position covers the nozzles 40 from below. As such, the nozzles 40 opened at the lower surface of the head 39 are protected by the cap 71. On the other hand, at the uncapping position, the cap 71 is separated from the lower surface of the head 39. FIG. 4 depicts the cap 71 at its uncapping position. The cap 71 is movable between the capping position and the uncapping position by a lift mechanism (not illustrated) driven by a motor (not illustrated).

As illustrated in FIG. 3, the waste tank 74 is positioned rearward of the maintenance unit 70. The waste tank 74 is positioned rightward of the right ends of the platen 42 and the guide member 18. Incidentally, the waste tank 74 may be positioned leftward of the left ends of the platen 42 and the guide member 18.

<Ink Receiving Portion 92>

As illustrated in FIG. 3, the printer 10 includes an ink receiving portion 92. The ink receiving portion 92 is positioned below the moving path of the carriage 23, and outside of the platen 42 and the guide member 18 in the left-right direction 9. In the present embodiment, the ink receiving portion 92 is positioned leftward of the left ends of the platen 42 and the guide member 18. However, the ink receiving portion 92 may be positioned rightward away from the platen 42 and the guide member 18.

The ink receiving portion 92 has a box-like shape that is open upward. An ink absorber 93 is accommodated in the ink receiving portion 92. The ink absorber 93 is configured to absorb ink to allow the ink receiving portion 92 to store the ink sucked from the nozzles 40.

The ink receiving portion 92 is positioned to face the head 39 when the carriage 23 is moved to the leftmost position. The ink absorber 93 receives ink droplets from above by way of so-called flushing which is an idle ejection of ink retained in the nozzles 40 when the carriage 23 is at the leftmost position. The ink droplets ejected from the nozzles 40 through the idle ejection are absorbed in the ink absorber 93, and are retained in the ink receiving portion 92.

Technical Advantages of the Embodiment

According to the present embodiment, the tank 30 is arrayed with the guide member 18 in the left-right direction 9. Hence, an increase in size of the printer 10 in the up-down direction 7 can be suppressed in comparison with a structure where the tank 30 is positioned above the guide member 18.

Further, according to the present embodiment, since the tank 30 is positioned frontward of the first conveyor roller 60, the first conveyor roller 60 does not become a bar against user's access to the tank 30 from a front side of the printer 10.

Further, according to the present embodiment, the space immediately behind the tank 30 can be effectively used for arrangement of the maintenance unit 70.

Further, according to the present embodiment, since the maintenance unit 70 and the waste tank 74 are arranged in line in the front-rear direction 8, an increase in size of the printer 10 in the left-right direction 9 can be suppressed Further, according to the present embodiment, since the sheet 12 is discharged frontward on the sloped wall 148, the user can easily collect the discharged sheet 12.

Further, when the opening/closing cover 152 is at the open position, replenishment of ink into the tank 30 or replacement of the tank 30 with a new tank 30 may be performed. At this time, ink may be adhered to the guide members 18, 19 in association with the ink replenishment or replacement of the tank since the opening/closing cover 152 is at the open position. To this effect, according to the present embodiment, the controller 130 is configured to control the operation panel 17 to display thereon a message prompting the user to move the opening/closing cover 151 from the open position to the closed position, in a case where that both of the opening/closing cover 151 and the opening/closing cover 152 are at the open position. With this configuration, user's attention can be drawn to the possibility of adhesion of ink to the guide members 18, 19 by way of the alarming through the operation panel 17.

Further, according to the present embodiment, since the supply port 33 is positioned frontward of the first conveyor roller 60, the first conveyor roller 60 does not become an obstacle against a work of replenishment of ink to the tank 30.

Further, according to the above-described embodiment, the supply port 33 is positioned below the uppermost ends of the guide member 18, 19 and 38. Hence, the printer 10 can have a compact size in the up-down direction 7.

<Modifications and Variations>

Figure 6:
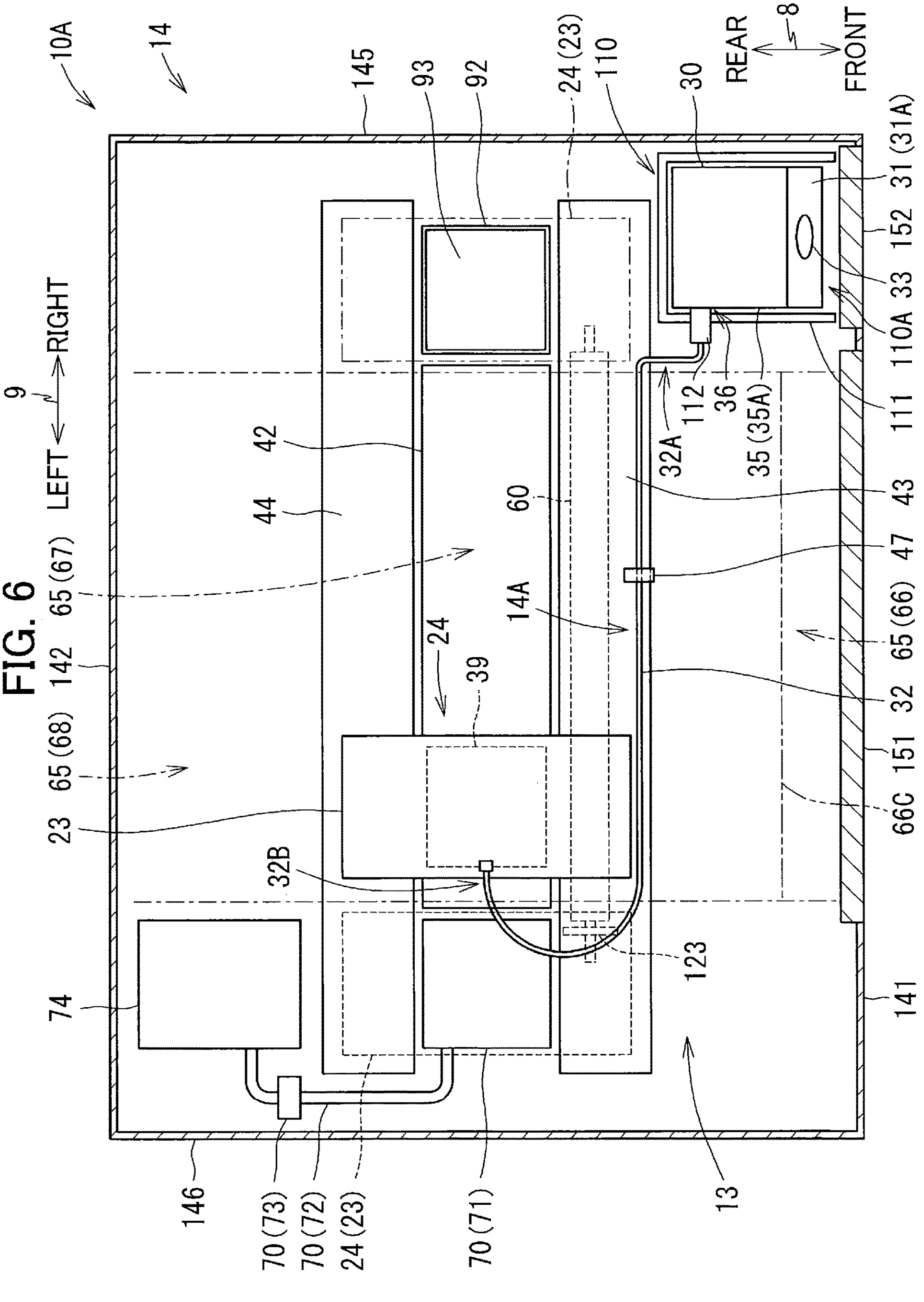
FIG. 6 is a transverse cross-sectional view of a printer 10A according to a first modification taken along a line corresponding to the line III-III in FIG. 1.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

In the above-described embodiment, the encoder disc 123 and the tank 30 are positioned rightward of the right end of the platen 42. That is, the encoder disc 123 and the tank 30 are positioned at the same side of the platen 42 in the left-right direction 9. However, the encoder disc 123 may be positioned opposite to the tank 30 with respect to the platen 42 in the left-right direction 9. As an example, in a printer 10A according to a first modification illustrated in FIG. 6, the tank 30 is positioned rightward of the right end of the platen 42, whereas the encoder disc 123 is positioned leftward of the left end of the platen 42.

In the above-described embodiment, the maintenance unit 70 and the tank 30 are positioned rightward of the right end of the platen 42. That is, the maintenance unit 70 and the tank 30 are positioned at the same side of the platen 42 in the left-right direction 9. Alternatively, the maintenance unit 70 and the tank 30 may be positioned opposite to each other with respect to the platen 42 in the left-right direction 9. For example, in the printer 10A according to the first modification illustrated in FIG. 6, the tank 30 is positioned rightward of the right end of the platen 42, whereas the maintenance unit 70 is positioned leftward of the left end of the platen 42. Incidentally, in this case, preferably, the waste tank 74 be positioned leftward of the left end of the platen 42, similar to the maintenance unit 70. Further, in this case, it is also preferable that the ink receiving portion 92 be positioned opposite to the maintenance unit 70 with respect to the platen 42 in the left-right direction 9, i.e., rightward of the right end of the platen 42.

In the above-described embodiment, the tank 30 is positioned rightward of the encoder disc 123. That is, the tank 30 is positioned outward of the encoder disc 123 in the left-right direction 9. As a modification, the tank 30 may be positioned inward of the encoder disc 123 in the left-right direction 9, or may be at the same position as the encoder disc 123 in the left-right direction 9.

In the above-described embodiment, the discharge hole 36 is formed in the left wall 35 of the tank 30. As a modification, the discharge hole 36 may be formed in any wall other than the left wall 35.

Figure 7:
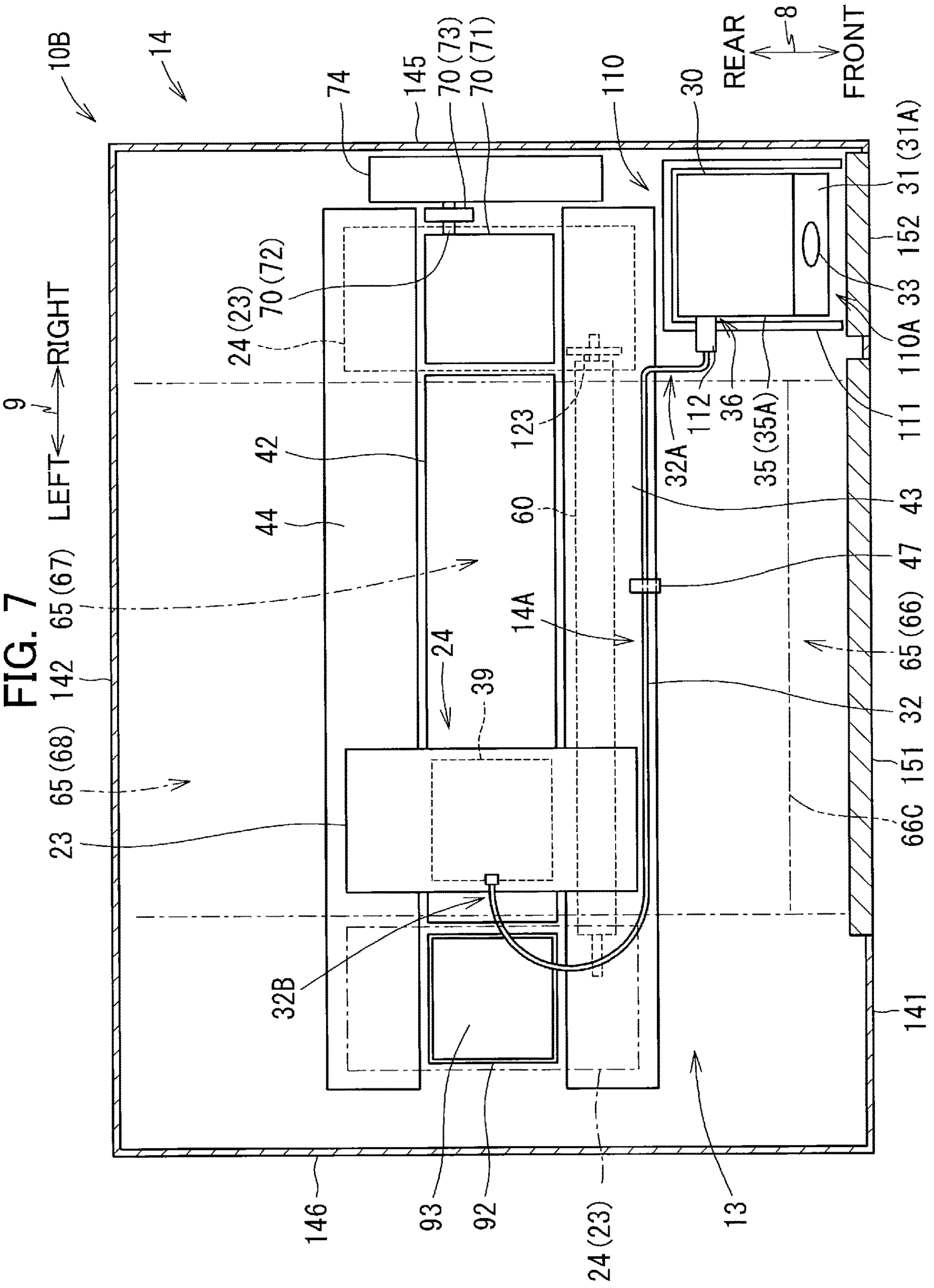
FIG. 7 is a transverse cross-sectional view of a printer 10B according to a second modification taken along a line corresponding to the line III-III in FIG. 1.

In the above-described embodiment, the waste tank 74 is positioned rearward of the maintenance unit 70. However, the waste tank 74 need not be positioned rearward of the maintenance unit 70. For example, in a printer 10B according to a second modification illustrated in FIG. 7, the waste tank 74 may be arranged in alignment with the maintenance unit 70 in the left-right direction 9.

In the above-described embodiment, the opening/closing cover 152 is positioned rightward of the opening/closing cover 151. That is, the opening/closing cover 152 is positioned at the right end portion of the front wall 141. Further, the accommodating portion 110 is positioned in the right front portion of the internal space 13 of the housing 14. As a modification, the opening/closing cover 152 may be at a position other than the position rightward of the opening/closing cover 151. For example, the opening/closing cover 152 may be positioned leftward of the opening/closing cover 151, i.e., in the left end portion of the front wall 141. In this case, the accommodating portion 110 may be positioned in a left front portion of the internal space 13 of the housing 14. Still alternatively, the opening/closing cover 152 may be at a position other than the front wall 141 of the housing 14. For example, the opening/closing cover 152 may be positioned at the right wall 145 of the housing 14. In this case, the accommodating portion 110 may be positioned in a right end portion of the internal space 13 of the housing 14.

In the above-described embodiment, the printer 10 includes the opening/closing cover 151 and the opening/closing cover 152. As a modification, the opening/closing covers 151 and 152 may be integral with each other. For example, in a printer 10C according to a third modification illustrated in FIG. 8, the printer 10C includes a single opening/closing cover 153.

The opening/closing cover 153 has the functions of both of the opening/closing cover 151 and the opening/closing cover 152. That is, when the opening/closing cover 153 is at a closed position thereof indicated by a solid line in FIG. 8, the guide member 19 constitutes the first curved passage 66 and the curved surface 18A is closed off against the outside, and at the same time, the accommodating portion 110 and the tank 30 are covered and closed off against the outside. On the other hand, when the opening/closing cover 153 is at an open position thereof indicated by a broken line in FIG. 8, the guide member 19 is exposed to the outside of the housing 14 and the curved surface 18A is exposed to the outside, and at the same time, the accommodating portion 110 and the tank 30 are exposed to the outside.

Figure 8:
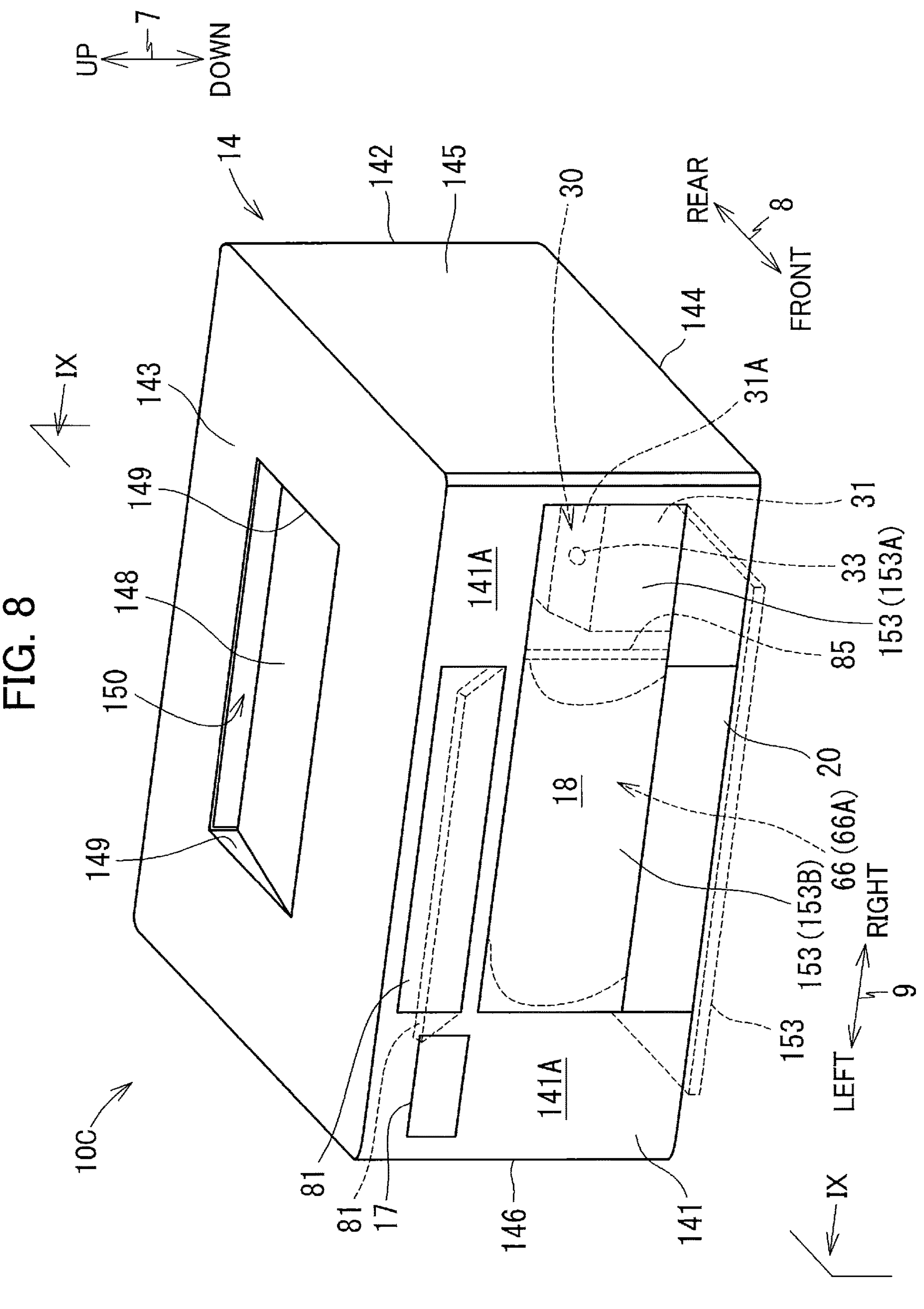
FIG. 8 is a perspective view of a printer 10C according to a third modification provided with a manual insertion tray 81.

Further, in the example of FIG. 8, a partitioning wall 85 is provided in the internal space 13 of the housing 14 at a position between the first curved passage 66 (the guide members 18, 19) and the accommodating portion 110 (the tank 30) for partitioning the first curved passage 66 from the accommodating portion 110 and the tank 30. The opening/closing cover 153 has a right portion 153A (a portion rightward of the partitioning wall 85) for covering the accommodating portion 110 and the tank 30. The opening/closing cover 153 has a left portion 153B (a portion leftward of the partitioning wall 85) to which the guide member 19 is attached.

Since the opening/closing cover 151 for exposing the curved surface 18A to the outside and the opening/closing cover 152 for covering the tank 30 against the outside are integrated and formed as a single member (the single opening/closing cover 153), the number of parts and components constituting the printer 10C can be reduced.

Further, in the printer 10C of FIG. 8, the partitioning wall 85 can restrain the ink from adhering to the guide members 18, 19 during the replenishment of ink to the tank 30 or at the time of replacement of the tank 30 with a new tank 30.

Figure 9:
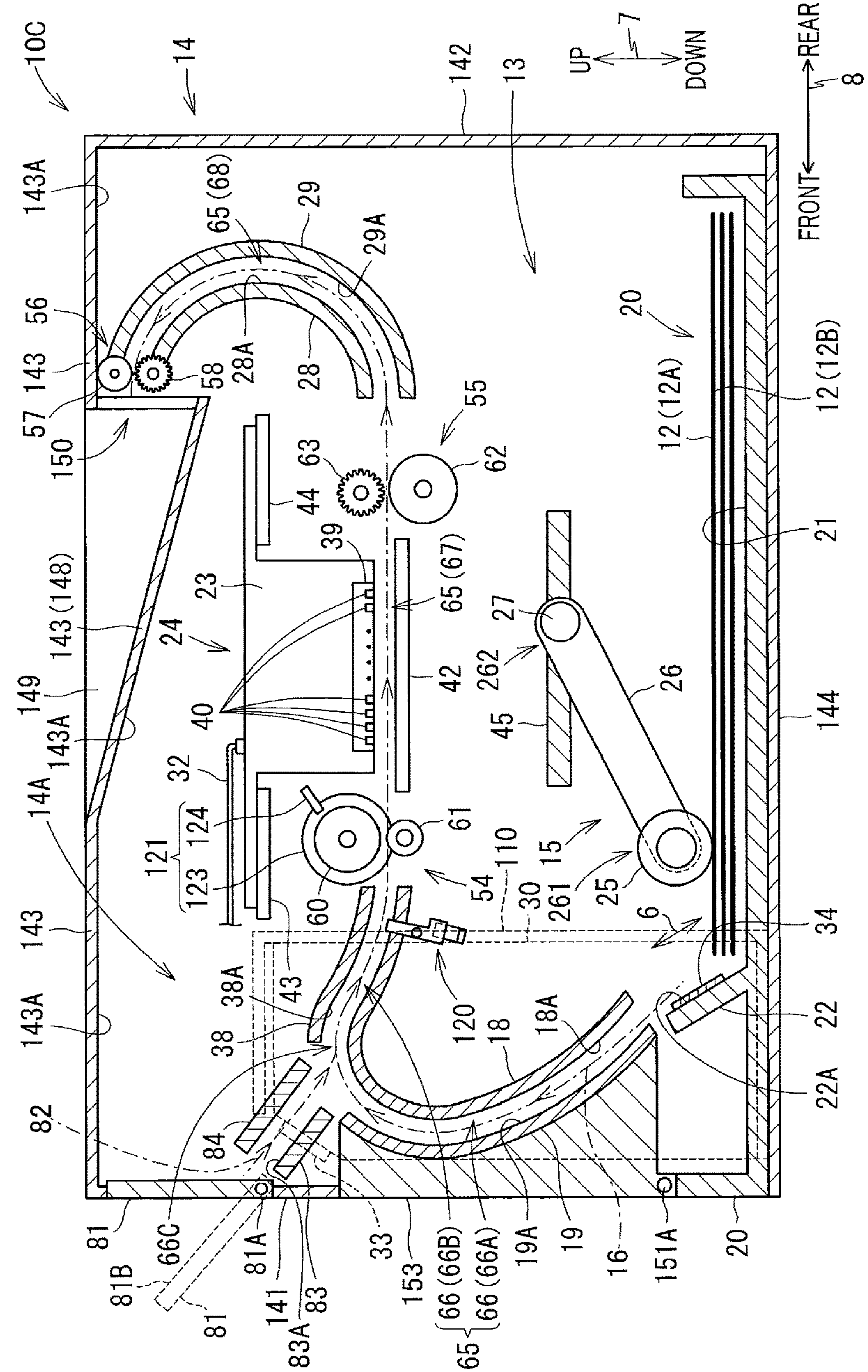
FIG. 9 is a vertical cross-sectional view of the printer 10C taken along a line IX-IX in FIG. 8.

Further, illustrated in FIGS. 8 and 9, a manual insertion tray 81 and a manual insertion passage 82 may be provided in the printer 10C.

The manual insertion tray 81 is positioned above the opening/closing cover 153 in the up-down direction 7 and is arranged at the same position as the platen 42 with respect to the left-right direction 9. The manual insertion tray 81 has a lower end portion provided with a shaft 81A (see FIG. 9) extending in the left-right direction 9. The shaft 81A is rotatably supported by the front wall 141, such that the manual insertion tray 81 is pivotally movable about an axis of the shaft 81A between a closed position indicated by solid lines in FIGS. 8 and 9 and an open position indicated by broken lines in FIGS. 8 and 9. When the manual insertion tray 81 is at the closed position, the manual insertion tray 81 constitutes a part of a front surface 141A of the front wall 141. When the manual insertion tray 81 is at the open position, the sheet 12 is supported on an upper surface 81B of the manual insertion tray 81.

The manual insertion passage 82 is provided in the internal space 13 of the housing 14. The manual insertion passage 82 constitutes a part of the sheet conveying passage 65. The manual insertion passage 82 is a path along which the sheet 12 supported on the upper surface 81B of the manual insertion tray 81 is configured to be conveyed. The manual insertion tray 81 is defined as a gap between guide members 83 and 84 facing and spaced away from each other by a predetermined distance. The guide member 83 has an upper surface 83A configured to guide the sheet 12 supported on the manual insertion tray 81.

The manual insertion passage 82 extends diagonally downward and rearward from the upper surface 81B of the manual insertion tray 81, and joins the first curved passage 66 at a position adjacent to the uppermost end 66C of the first curved passage 66. That is, the manual insertion passage 82 extends from the front surface 141A of the housing 14 to the first curved passage 66. The guide member 83 extends diagonally downward and rearward from a position adjacent to the shaft 81A of the manual insertion tray 81. The guide member 84 is positioned to face the guide member 83 from above.

The sheet 12 is supported on the upper surface 81B of the manual insertion tray 81 such that the leading edge of the sheet 12 is in abutment with the pair of first conveyor rollers 54. In this state, the sheet 12 supported on the upper surface 81B is conveyed toward the recording unit 24 in the conveying direction 16 by the rotation of the first conveyor roller 60.

As is apparent from FIG. 8, the guide member 83 is positioned beside and leftward of the accommodating portion 110 and the tank 30 in the left-right direction 9. Further, as illustrated in FIG. 9, the guide member 83 is positioned between the upper ends and the lower ends of the accommodating portion 110 and the tank 30. The broken lines indicated in FIG. 9 show the positions of the accommodating portion 110 and the tank 30. In FIG. 9, the accommodating portion 110 and the tank 30 are positioned at nearer side (closer to the viewer who is facing the sheet of FIG. 9) than the guide member 83. Incidentally, in the third modification illustrated in FIG. 9, the guide member 83 in its entirety is positioned between the upper ends and the lower ends of the accommodating portion 110 and the tank 30. As a modification, only a part of the guide member 83 may be positioned between the upper ends and the lower ends of the accommodating portion 110 and the tank 30 in the up-down direction 7.

In the configuration illustrated in FIG. 9 where the guide member 83 is positioned below the upper end of the tank 30, the printer 10C can have a smaller size in the up-down direction 7, in comparison with a structure where the guide member 83 is positioned above the upper end of the tank 30.

The opening/closing covers 151, 152 according to the embodiment and the opening/closing cover 153 according to the third modification are pivotally movable between the open position and the closed position. However, the opening/closing covers 151, 152, 153 need not be pivotably movable. For example, the opening/closing covers 151, 152, 153 may be slidably movable to move between the open position and the closed position. Alternatively, the covers 151, 152, 153 may be manually movable so as to be attachable to and detachable from the housing 14 to provide the open position (at the time of detachment) and the closed position (at the time of attachment).

In the above-described embodiment, the recording unit 24 is of the so-called serial head type in which the head 39 is movable in the left-right direction 9 integrally with the carriage 23. However, the recording unit 24 may be of the line head type in which the recording unit 24 does not includes the carriage 23 and the head 39 extends to span from the left end to the right end of the sheet conveying passage 65.

In the above-described embodiment, the single tank 30 is accommodated in the accommodating portion 110. That is, the printer 10 includes the single tank 30. However, the printer 10 may include a plurality of tanks.

Figure 10:
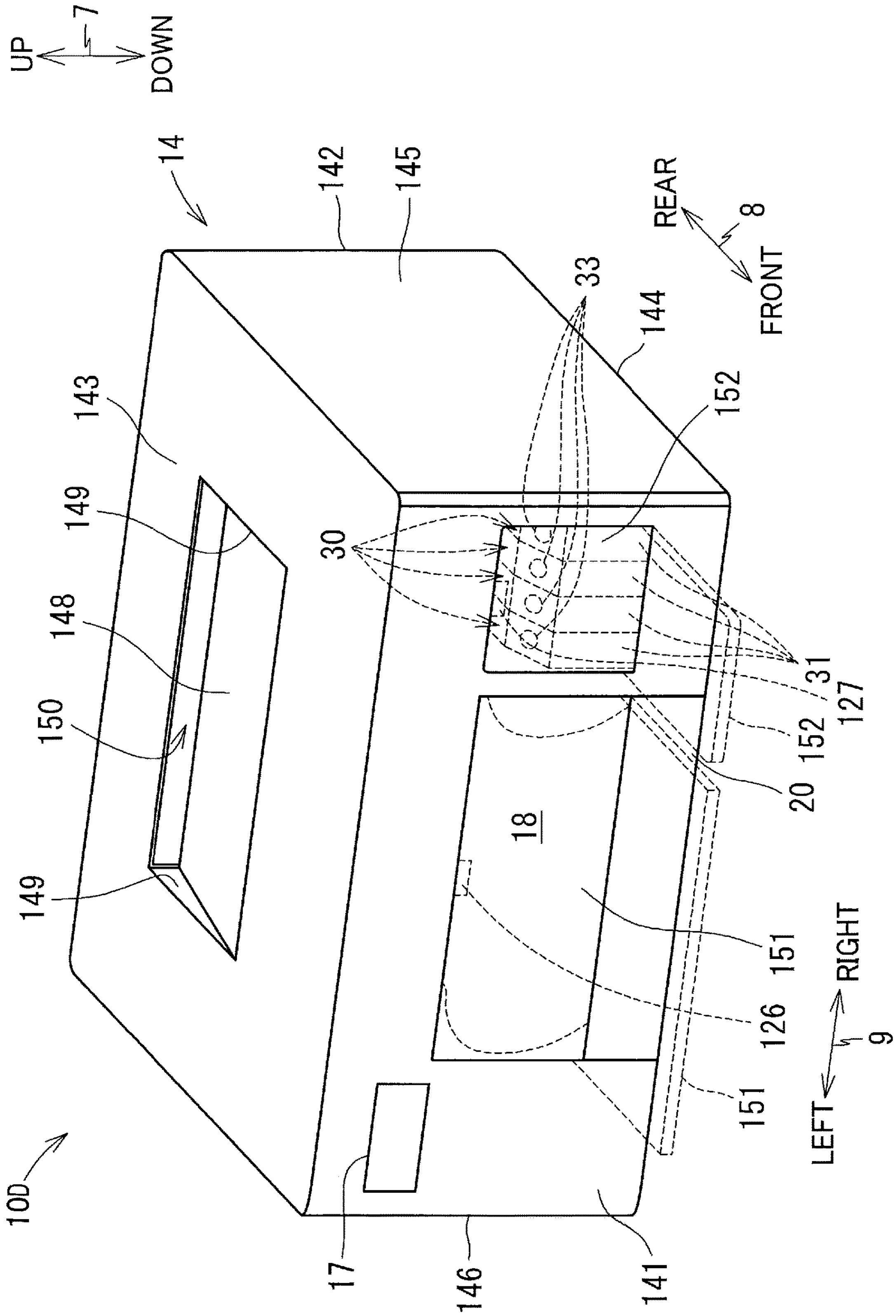
FIG. 10 is a perspective view of a printer 10D according to a fourth modification.

As an example, FIG. 10 illustrates a printer 10D according to a fourth modification which includes a plurality of tanks 30. To this effect, the accommodating portion 110 is configured to accommodate the plurality of tanks 30 therein. In the example of FIG. 10, four tanks 30 corresponding to the ink colors of black, cyan, magenta, and yellow are accommodated in the accommodating portion 110. However, the number of the tanks 30 to be accommodated in the accommodating portion 110 need not be four, and the colors of ink stored in the tanks 30 need not be the above-mentioned four colors.

Figure 11:
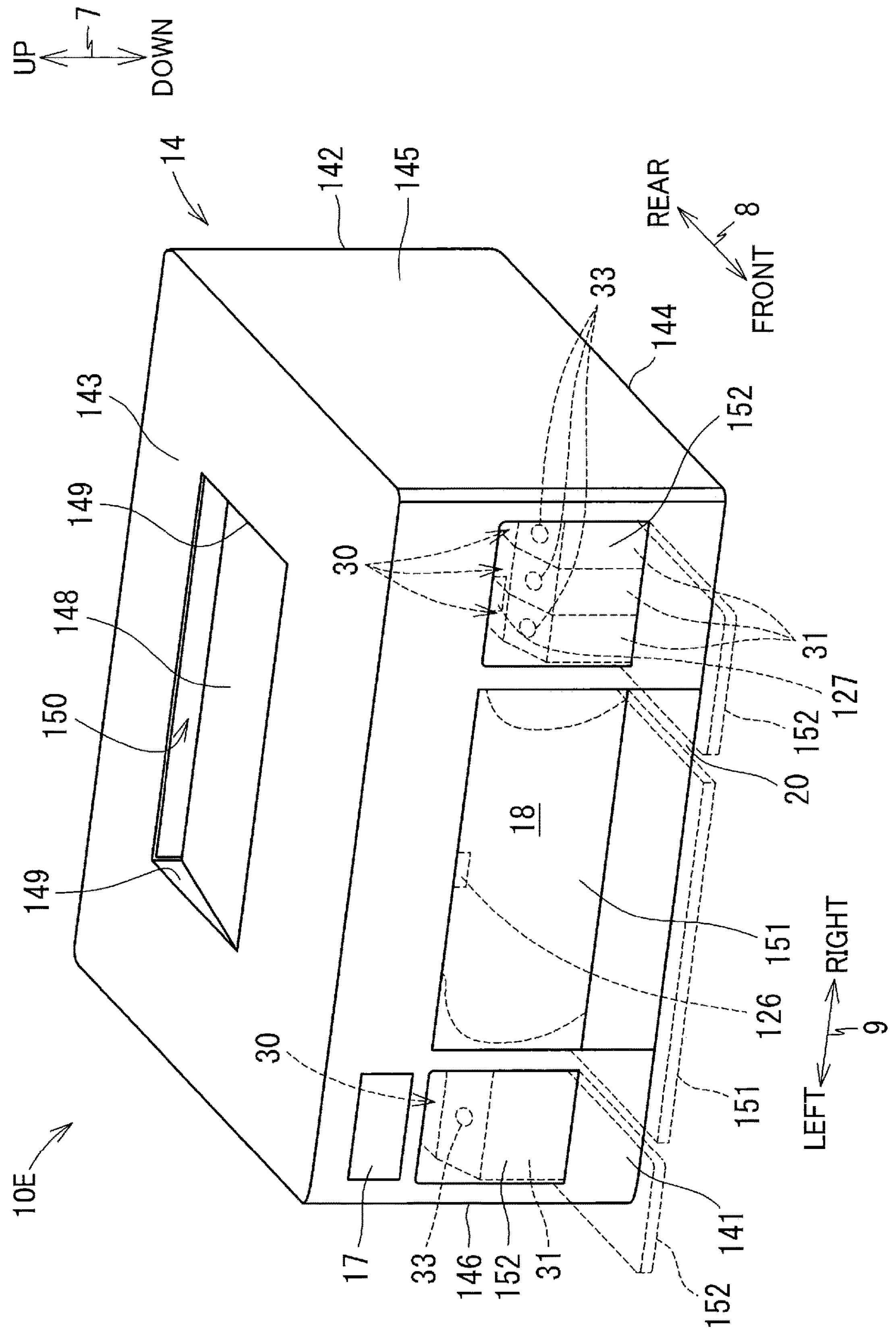
FIG. 11 is a perspective view of a printer 10E according to a fifth modification.

Still alternatively, a printer 10E may include a plurality of accommodating portions 110, and each accommodating portion 110 may be configured to accommodate at least one tank 30, as illustrated in FIG. 11. In this fifth modification illustrated in FIG. 11, two of the opening/closing covers 152 are provided one each at the left and right sides of the opening/closing cover 151 in the left-right direction 9. Hence, the plurality of accommodating portions 110 is provided rearward of each opening/closing cover 152. The accommodating portion 110 positioned rearward of the left opening/closing cover 152 is configured to accommodate a single tank 30 in which black ink is stored. The accommodating portion 110 positioned rearward of the right opening/closing cover 152 is configured to accommodate three tanks 30 in which ink of the cyan, magenta, and yellow colors is stored, respectively. The number of the opening/closing cover 152, the number of the accommodating portion 110, the number of the tanks 30 to be accommodated in each accommodating portion 110, and the color of ink to be stored in each tank 30 may be different from those described above.

Figure 12:
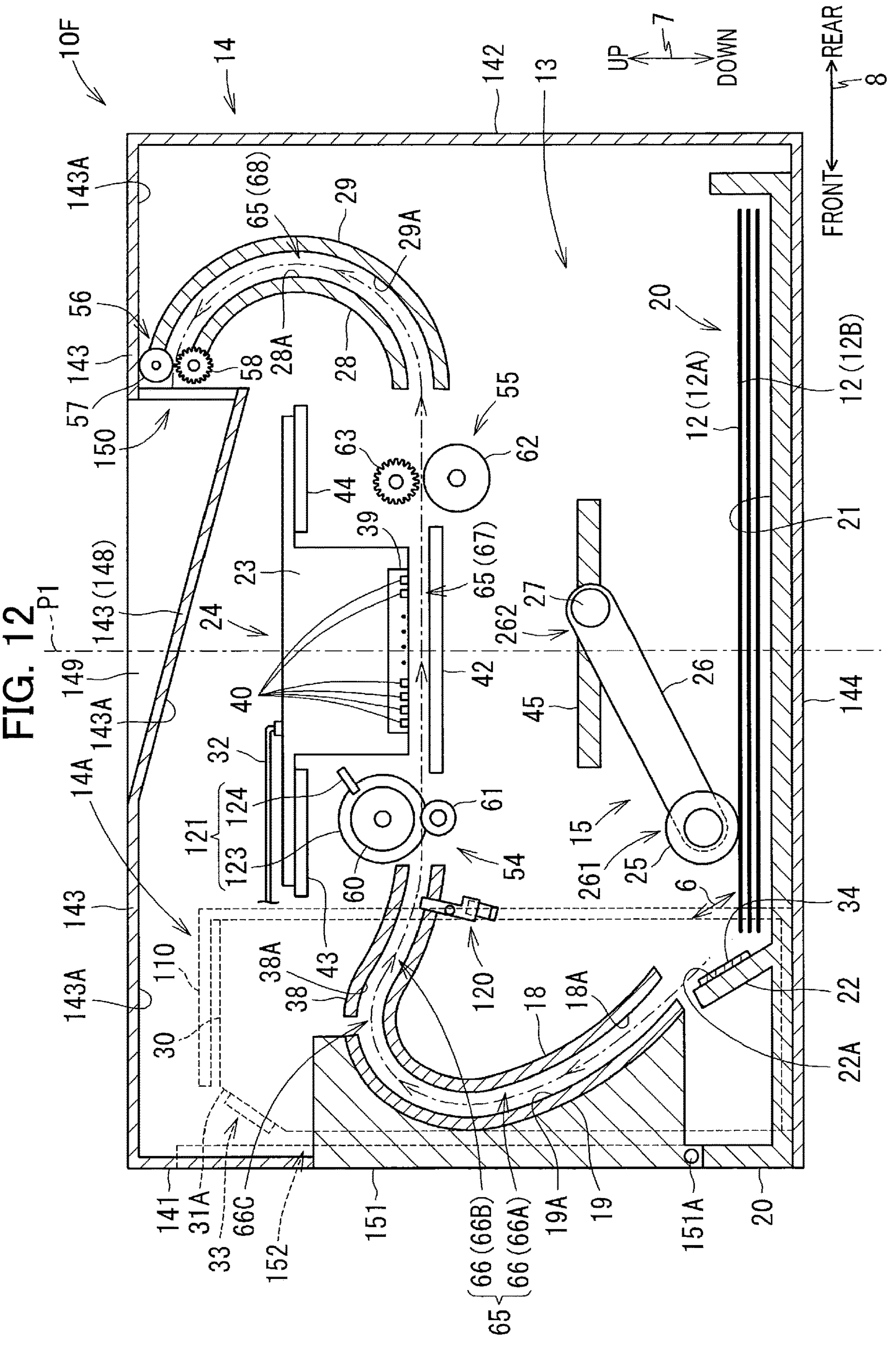
FIG. 12 is a vertical cross-sectional view of a printer 10F according to a sixth modification taken along a line corresponding to the line II-II in FIG. 1, and particularly illustrating a structure where a supply port 33 is positioned higher than an upper end 66C of a first curved passage 66.

According to the above described embodiment, the supply port 33 is positioned below the uppermost end 66C of the first curved passage 66. However, the supply port 33 may be arranged at the same height as the uppermost end 66C of the first curved passage 66. Still alternatively, or, as illustrated by broken lines in FIG. 12, the supply port 33 may be arranged above the uppermost end 66C of the first curved passage 66. That is, the supply port 33 may be at the same height as the uppermost ends of the guide members 18, 19 and 38, or higher than the uppermost ends of the guide members 18, 19 and 38. Referring to FIG. 12, in a printer 10F according to a sixth modification where the supply port 33 is positioned above the guide members 18, 19 and 38, the upper end of the tank 30 is at a higher position than in the printer 10 of the embodiment illustrated in FIG. 2. Accordingly, the opening/closing cover 152 may be also arranged at a higher position than in the printer 10 of the embodiment shown in FIG. 2, as indicated by broken lines in FIG. 12.

Further, in the printer 10F according to the sixth modification, since the supply port 33 is positioned higher than the upper end of the guide member 18, an enlarged tank 30 can be set, and hence, a greater amount of ink can be stored in the tank 30.

In the above-described embodiment, the tank 30 is described as an example of a "storage body" of the disclosure. In the embodiment, the tank 30 is mounted on the accommodating portion 110, and ink can be replenished in the tank 30 through the supply port 33 when the amount of ink in the tank 30 becomes smaller. However, the storage body of the disclosure is not limited to the tank 30, may be in a form of an ink cartridge that stores ink therein. In this case, the ink cartridge is attachable to and detachable from the accommodating portion 110. The ink cartridge may be detached from the accommodating portion 110 when the residual amount of ink in the ink cartridge becomes smaller, and a new ink cartridge containing a sufficient amount of ink is attached to the accommodating portion 110.

In the above-described embodiment, the printers 10 through 10F are employed as examples of an inkjet recording device of the disclosure. Alternatively, the inkjet recording device of the disclosure may be a multifunction device. FIG. 13 illustrates a multifunction device 5 as another example of the inkjet recording device of the disclosure. The multi-function device 5 includes the printer 10 and a scanner unit 11 provided on top of the housing 14 of the printer 10. The scanner unit 11 is seated on the printer 10 through columnar bodies 154. The printer 10 and the scanner unit 11 are electrically connected to each other by cables (not illustrated) arranged inside the columnar bodies 154. The scanner unit 11 may be a conventional scanner unit such as a flat-bed type scanner unit, and, therefore, a detailed description as to the scanner unit 11 will be omitted.

While the description has been made in detail with reference to the specific embodiment and modifications, it would be apparent to those skilled in the art that various changes and further modifications may be made therein without departing from the scope of the disclosure.

<Remarks>

The printer 10 is an example of an inkjet recording device. The multifunction device 5 is another example of the inkjet recording device. The sheet supply tray 20 is an example of a first tray. The sheet 12 is an example of a sheet. The tank 30 is an example of a storage body. The head 39 is an example of a head. The platen 42 is an example of a platen. The guide member 18 is an example of a first guide member. The curved surface 18A is an example of a first curved surface. The first conveyor roller 60 is an example of a conveyor roller. The maintenance unit 70 is an example of a maintenance unit. The waste tank 74 is an example of a waste tank. The housing 14 is an example of a housing. The opening 150 is an example of a discharge portion. The guide member 29 is an example of a second guide member. The curved surface 29A is an example of a second curved surface. The manual insertion tray 81 is an example of a second tray. The sheet 12 mounted on the manual insertion tray 81 is an example of a second sheet. The guide member 83 is an example of a third guide member. The upper surface 83A of the guide member 83 is an example of a guide surface of the third guide member. The opening/closing cover 153 is an example of a cover member. The left portion 153B of the opening/closing cover 153 is an example of a first cover part of the cover member. The guide member 19 is an example of a guide portion of the first cover part of the cover member.

The curved surface 19A of the guide member 19 is an example of a third curved surface. The right portion 153A of the opening/closing cover 153 is an example of a second cover part of the cover member. The partitioning wall 85 is an example of a partitioning wall. The opening/closing cover 151 is an example of a first cover member. The opening/closing cover 152 is an example of a second cover member. The operation panel 17 is an example of an alarm part. The controller 130 is an example of a controller. The scanner unit 11 is an example of a scanner unit. The supply port 33 is an example of a supply port of the storage body. The separation portion 34 is an example of a separation portion. The uppermost end 66C is an example of an upper end of the first guide member.

What is claimed is:

1. An inkjet recording device comprising:

a first tray configured to support a sheet, the sheet having a first surface and a second surface opposite each other;

a storage body storing ink therein;

a head positioned above the first tray, the head comprising nozzles through which the ink supplied from the storage body is configured to be ejected;

a platen positioned between the head and the first tray in an up-down direction, the platen being configured to support the first surface of the sheet conveyed rearward in a front-rear direction at a position below the head; and a first guide member positioned frontward of the head in the front-rear direction, the first guide member having a first curved surface configured to guide the first surface of the sheet conveyed from the first tray toward the platen, wherein the first guide member has a portion arranged in alignment with the storage body in a widthwise direction perpendicular to the up-down direction and the front-rear direction, and wherein the first guide member has a portion positioned at the same height as the storage body in the up-down direction.

2. The inkjet recording device according to claim 1, further comprising a conveyor roller positioned frontward of the head in the front-rear direction and configured to convey the sheet toward the platen, wherein the storage body is positioned frontward of the conveyor roller in the front-rear direction.

3. The inkjet recording device according to claim 2, further comprising a maintenance unit configured to receive ink discharged from the head, the maintenance unit being positioned outward relative to the first guide member in the widthwise direction and rearward of the conveyor roller in the front-rear direction.

4. The inkjet recording device according to claim 3, further comprising a waste tank configured to retain the ink discharged from the maintenance unit, the waste tank being positioned outward relative to the first guide member in the widthwise direction and rearward of the maintenance unit in the front-rear direction.

5. The inkjet recording device according to claim 3, further comprising a waste tank configured to store the ink discharged from the maintenance unit, the waste tank being arranged in alignment with the maintenance unit in the widthwise direction.

6. The inkjet recording device according to claim 1, further comprising:

a housing accommodating therein the storage body, the head, the platen, and the first guide member, the housing defining a center position in the front-rear direction;

a discharge portion through which the sheet is configured to be discharged to an outside of the housing, the discharge portion being positioned rearward of the center position in the front-rear direction; and a second guide member positioned rearward of the head in the front-rear direction, the second guide member having a second curved surface configured to guide the first surface of the sheet conveyed from the platen toward the discharge portion.

7. The inkjet recording device according to claim 1, further comprising:

a housing accommodating therein the storage body, the head, the platen, and the first guide member, the housing comprising a front wall;

a second tray provided at the front wall and configured to support a second sheet thereon, the second sheet having a first surface; and a third guide member positioned frontward of the head in the front-rear direction, the third guide member having a guide surface configured to guide the first surface of the second sheet conveyed from the second tray toward the platen, the third guide member having a portion arranged in alignment with the storage body in the widthwise direction, and the third guide member having a portion positioned at the same height as the storage body in the up-down direction.

8. The inkjet recording device according to claim 1, further comprising:

a housing accommodating therein the storage body, the head, the platen, and the first guide member, the housing defining an accommodation space therein in which the storage body is accommodated; and a cover member supported by the housing and movable relative to the housing between a first position and the second position, the cover member comprising:

a first cover part comprising a guide portion, the guide portion having a third curved surface configured to face the first curved surface to guide the second surface of the sheet; and a second cover part configured to cover the storage body in the accommodation space;

wherein, when the cover member is at the first position, the guide portion opposes and covers the first curved surface and the second cover part opposes and covers the storage body, and when the cover member is at the second position, the first curved surface and the storage body are both exposed to an outside of the housing.

9. The inkjet recording device according to claim 8, further comprising a partitioning wall partitioning the storage body in the accommodation space from the guide portion when the cover member is at the first position.

10. The inkjet recording device according to claim 1, further comprising:

a first cover member including a guide portion, the guide portion having a third curved surface configured to face the first curved surface to guide the second surface of the sheet, the first cover member being movable between a first position where the guide portion covers the first curved surface and a second position where the first curved surface is exposed to an outside;

a second cover member movable between a closed position for covering the storage body and an open position for exposing the storage body to the outside;

an alarm part configured to generate an alarm prompting the first cover member to be moved from the second position to the first position; and a controller configured to control the alarm part to generate the alarm when the first cover member is at the second position and the second cover member is at the open position.

11. The inkjet recording device according to claim 1, further comprising:

a housing accommodating therein the storage body, the head, the platen, and the first guide member; and a scanner unit supported by the housing such that the scanner unit is positioned above the housing to face the housing.

12. The inkjet recording device according to claim 1, further comprising a conveyor roller positioned frontward of the head in the front-rear direction and configured to convey the sheet toward the platen, wherein the storage body has a supply port through which ink is replenished into an interior of the storage body, the supply port being positioned frontward of the conveyor roller in the front-rear direction.

13. The inkjet recording device according to claim 12, wherein the first tray is configured to support a plurality of the sheets in a stacked state;

the inkjet recording device further comprising:

a separation portion configured to separate an uppermost sheet from remaining sheets supported on the first tray upon abutment of at least one leading edge of the sheet to be conveyed from the first tray toward the first curved surface, wherein the supply port is positioned above the separation portion.

14. The inkjet recording device according to claim 12, wherein the supply port is positioned at a height equal to or lower than a height of an upper end of the first guide member.

15. The inkjet recording device according to claim 12, wherein the supply port is positioned above an upper end of the first guide member.

* * * * *